United States Patent
Magi et al.

(10) Patent No.: US 12,085,995 B2
(45) Date of Patent: Sep. 10, 2024

(54) DYNAMIC CURVATURE DEVICES AND PERIPHERALS

(71) Applicant: Intel Corporation, Santa Clara, CA (US)

(72) Inventors: Aleksander Magi, Portland, OR (US); Evan P. Kuklinski, Beaverton, OR (US); Shawn S. McEuen, Portland, OR (US); David W. Browning, Portland, OR (US); Juha Tapani Paavola, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/033,768

(22) Filed: Sep. 26, 2020

(65) Prior Publication Data
US 2021/0026416 A1    Jan. 28, 2021

(51) Int. Cl.
*G06F 1/16* (2006.01)
*G06F 3/02* (2006.01)

(52) U.S. Cl.
CPC .......... *G06F 1/1671* (2013.01); *G06F 1/1652* (2013.01); *G06F 3/0219* (2013.01)

(58) Field of Classification Search
CPC . G02B 27/0176; G06F 1/1601; G06F 1/1616; G06F 1/1652; G06F 1/1656; G06F 1/1662; G06F 1/1671; G06F 1/1679; G06F 1/1681; G06F 1/1683; G06F 3/0219
See application file for complete search history.

(56) References Cited

U.S. PATENT DOCUMENTS

| | | | |
|---|---|---|---|
| 9,081,540 B1* | 7/2015 | Cho | G06F 1/1601 |
| 10,229,618 B2* | 3/2019 | Chen | G09F 15/0031 |
| 10,401,908 B2* | 9/2019 | Chen | G06F 1/1616 |
| 10,476,011 B2* | 11/2019 | Kang | G02F 1/133308 |
| 10,772,224 B2* | 9/2020 | Lan | G06F 1/1616 |
| 11,163,335 B1* | 11/2021 | Tzeng | G06F 1/1652 |
| 11,630,635 B2* | 4/2023 | Cho | H04R 5/02 |
| | | | 381/152 |
| 2015/0009635 A1* | 1/2015 | Kang | G09F 19/02 |
| | | | 361/749 |
| 2015/0035812 A1* | 2/2015 | Shin | G06F 1/1601 |
| | | | 345/204 |
| 2015/0219902 A1* | 8/2015 | Kim | G02B 27/0176 |
| | | | 345/8 |
| 2015/0331445 A1* | 11/2015 | Liu | G06F 1/162 |
| | | | 361/679.55 |

(Continued)

*Primary Examiner* — Dmitriy Bolotin
(74) *Attorney, Agent, or Firm* — Alliance IP, LLC

(57) ABSTRACT

Computing devices and peripherals having a dynamic curvature are disclosed. The base of a laptop can curve as the laptop lid is opened due to left and right base portions being pulled inward to a bisector of the base. Base portions can be pulled inwards by a bending strap pushed upwards by a lifter spring, by base hinges that rotate inwards, or a shape memory allow wire laced around pulleys that contract when heated. A display device with dynamic curvature can curve due to a rack and pinion linear actuator that extends or shortens adjustable rods housed in the display support. A base or display can be curved based on the context of the computer device or in response to certain events. The curvature of a base or display can be tunable by a user. Curved bases and displays can reduce wrist and eye strain.

25 Claims, 12 Drawing Sheets

(56) References Cited

U.S. PATENT DOCUMENTS

| | | | |
|---|---|---|---|
| 2016/0040764 A1* | 2/2016 | Park | G09F 9/301 |
| | | | 361/679.01 |
| 2016/0157372 A1* | 6/2016 | Hiroki | G06F 1/1637 |
| | | | 361/679.01 |
| 2016/0212840 A1* | 7/2016 | Koo | G06F 1/1626 |
| 2017/0023972 A1* | 1/2017 | Xin | G06F 1/1643 |
| 2017/0188470 A1* | 6/2017 | Cho | G09F 9/301 |
| 2018/0226001 A1* | 8/2018 | Chen | G09F 19/02 |
| 2019/0239369 A1* | 8/2019 | Lan | G06F 1/1652 |
| 2021/0014989 A1* | 1/2021 | Hsu | H04M 1/0268 |
| 2021/0026416 A1* | 1/2021 | Magi | G06F 1/1601 |
| 2021/0141587 A1* | 5/2021 | Cho | G06F 3/16 |

\* cited by examiner

900

INCREASE OR DECREASE TEMPERATURE OF WIRE TO CHANGE CURVATURE OF BASE OF COMPUTING DEVICE
910

ROTATE GEARWHEEL TO EXTEND OR DECREASE LENGTH OF ONE OR MORE ADJUSTABLE STRIPS IN DISPLAY DEVICE TO CHANGE CURVATURE OF DISPLAY DEVICE  1010

DYNAMIC CURVATURE DEVICES AND PERIPHERALS

BACKGROUND

Laptops and stand-alone keyboards having with profiles can cause repetitive strain injuries to users who use these devices extensively. Stand-alone keyboards with angled or curved profiles provide improved ergonomics. Laptops and external monitors with flat profiles also present ergonomic issues. The variability in the distance between a user's eyes and the display across the width of the display can cause eye strain, a problem that is exacerbated in larger displays. Curved displays that reduce this eye-to-display surface variability help mitigate this problem. Existing curved keyboards and displays have a static physical profile.

BRIEF DESCRIPTION OF THE DRAWINGS

FIG. 9 illustrates an exemplary method for controlling the curvature of a computing device base.

DETAILED DESCRIPTION

Figure 1A:
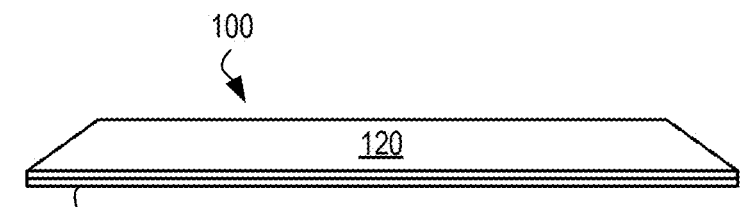
FIGS. 1A-1C illustrate front views of a first exemplary computing device with dynamic curvature.

Computing devices and peripherals are disclosed herein that have a dynamic curvature. That is, they have a physical profile that can transition between flat (no curvature) and curved. These devices' physical profile can change in response to events, such as a lid being opened or closed, or upon receipt of user input indicating the user wishes the device to take on a preferred degree of curvature. Disclosed herein are various embodiments by which the opening or closing of a lid is translated to the curving or uncurving of a device base. In other embodiments, a computing device base or display can be curved as part of or in response to various processes or actions taken by the device. As will be discussed in greater detail, computing devices and peripherals with dynamic curvature provide ergonomic, portability, thermal management, and user experience advantages over existing computing devices and peripherals that have static physical profiles.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, a computing device base that is substantially flat includes bases that have features that prevent it from being planar or have a curvature of a few degrees.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, wherein similar or same numbers may be used to designate the same or similar parts in different figures. The use of similar or same numbers in different figures does not mean all figures including similar or same numbers constitute a single or same embodiment. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

Figure 1B:
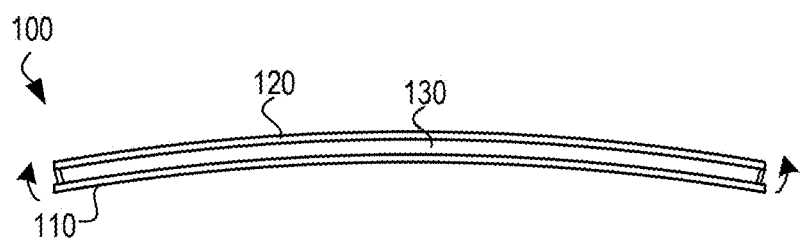
Figure 1C:
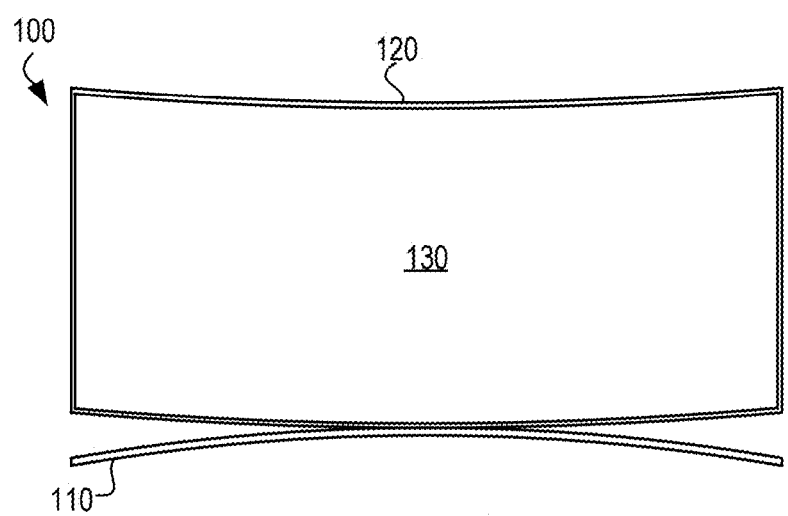

FIGS. 1A-1C illustrate front views of a first exemplary computing device with dynamic curvature. The exemplary computing device 100 comprises a base 110 and a lid 120. The computing device can be any type of computing device disclosed or referenced herein, such as a laptop computer. The lid 120 comprises a display 130. FIG. 1A illustrates the computing device 100 with the lid closed and in which the computing device 100 is substantially flat. FIG. 1B illustrates the base 110 and the lid 120 curving as the lid 120 is opened. FIG. 1C illustrates the computing device 100 with the lid 120 fully opened with a curved base 110 and lid 120. In some embodiments, the amount of curvature of the base 110 and the amount of the curvature of the lid 120 increase as the lid 120 is opened. The base 110 and the lid 120 return to being substantially flat when the lid 120 is closed. The dynamic curvatures of the base 110 and the lid 120 of the computing device 100 are enabled by the technologies disclosed herein.

Figure 2A:
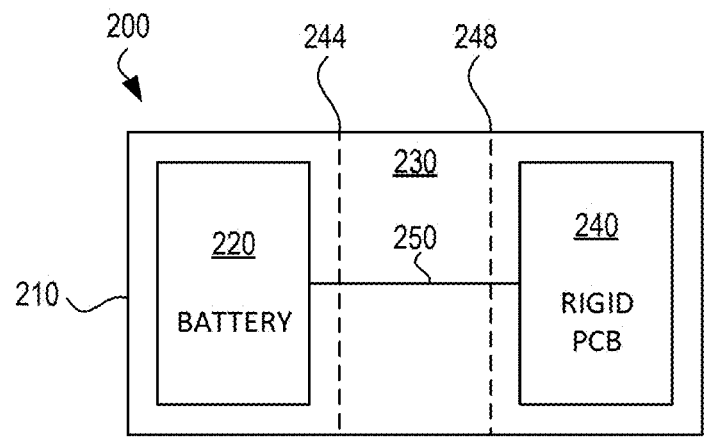
FIGS. 2A and 2B illustrate block diagrams of second and third exemplary computing devices with dynamic curvature.
Figure 2B:
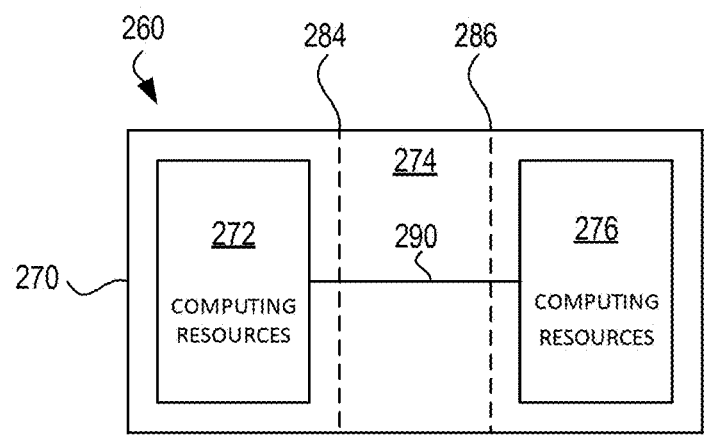

FIGS. 2A and 2B illustrate block diagrams of second and third exemplary computing devices with dynamic curvature. The computing device 200 in FIG. 2A comprises a base 210. The base 210 comprises a left portion 220, a middle portion 230, and a right portion 240. The left portion 220 and the right portion 240 are rigid and the middle portion 230 is flexible. Adjacent base portions can flex with respect to each other about flex axes or flexible portions 244 and 248. That is, the left portion 220 can flex with respect to the middle portion 230 about the flex axis 244, and the right portion 240 can flex with respect to the middle portion 230 about the flex axis 248. Being rigid, the left portion 220 and the right portion 240 remain substantially flat as each is flexed about flex axes 244 and 248, respectively. Being flexible, the middle portion 230 can curve in response to the left portion 220 and the right portion 240 being flexed about the flex axes 244 and 248.

In some embodiments, a rigid printed circuit board (PCB) comprising the computing resources of the computing device 200, such as a motherboard, can be located in the right portion 240 and powered by a battery located in the left portion 220. The battery and the motherboard can be connected by a flexible connecting cable 250 that extends across the flexible middle portion 230. In other embodiments, the motherboard can be located in the left portion 220 and the battery can be located in the right portion 240.

FIG. 2B illustrates a computing device comprising a base with a rigid flex printed circuit board. The computing device 260 comprises a base 270 comprising a left portion 272, a middle portion 274, and a right portion 276. A rigid flex printed circuit board (a printed circuit that comprises both rigid and flexible components) extends across the three base portions 272-276. The left portion 272 and the right portion 276 are rigid and the middle portion 274 is flexible, with the left portion 272 and the right portion 276 being able to flex with respect to the middle portion 274 about flex axes or portions 284 and 286, respectively. Computing device components (processors, memory, storage, I/O circuitry, etc.) can be distributed across the portions of the rigid flex printed circuit board that reside in the left portion 272 and the right portion 276. Computing resources in the left portion 272 can be communicatively coupled to computing resources in the right portion 276 by one or more rigid flex printed circuit board interconnections 290 extending across the middle portion 274. For example, in some embodiments, the left portion 272 can comprise input/output (I/O) circuitry and the right portion 276 can comprise high-performance computing resources.

Although the computing devices 200 and 260 comprise three base portions, in other embodiments, any of the computing devices described herein can comprise more than one left, middle, or right base portions with additional flex axes or flexible regions between adjacent base portions. For example, in some embodiments, a computing device can comprise two left portions, a middle portion, and two right portions with an additional flex axis or region between the two left portions and an additional flex axis or region between the two right portions. In some embodiments, one or more of the left base portions and one or more of the right portions can be flexible.

FIGS. 3A-3D illustrate various views of a fourth exemplary computing device with dynamic curvature. The computing device 300 comprises a base 310 connected to a lid 320 via a hinge 330. The lid 320 comprises a display 392. A lifter spring 340 is attached to the lid 320, wraps around the hinge 330, and extends into a pocket 344 in the base 310. The base 310 further comprises a left base portion 312, a middle base portion 314, and a right base portion 316. The pocket 344 is located in the middle base portion 314. The left and right base portions 312 and 316 are rigid and the middle base portion 314 is flexible. The base 310 further comprises a cavity 350 and a bending strap 360 located within the cavity 350. A portion of the bending strap 360 lies above a portion of the lifter spring 340. A first end 364 of the strap 360 is attached or anchored to the left base portion 312 and a second end 368 of the bending strap 360 is attached or anchored to the right base portion 316. The base 310 further comprises gaps 372 and 374 and flexible portions 376 and 378, which allow the left and right base portions 312 and 316 to flex with respect to the middle portion 314 and be pulled inwards toward a y-axis bisector 380 of the base 310 as the lid 320 is opened, as will be described below.

Figure 3A:
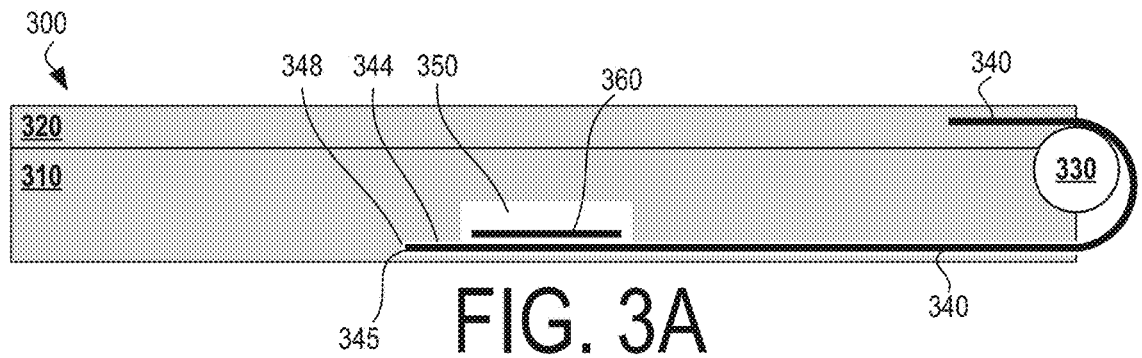
FIGS. 3A and 3B show side and front cross-sectional views, respectively, of a fourth exemplary computing device with dynamic curvature with the lid closed.
Figure 3B:
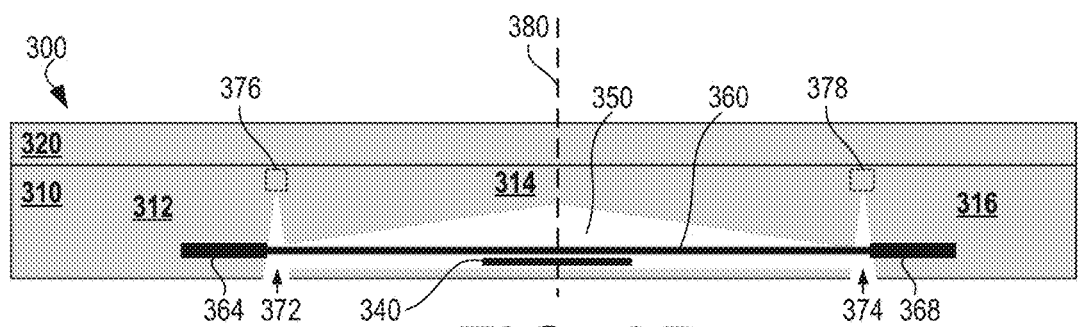
Figure 3C:
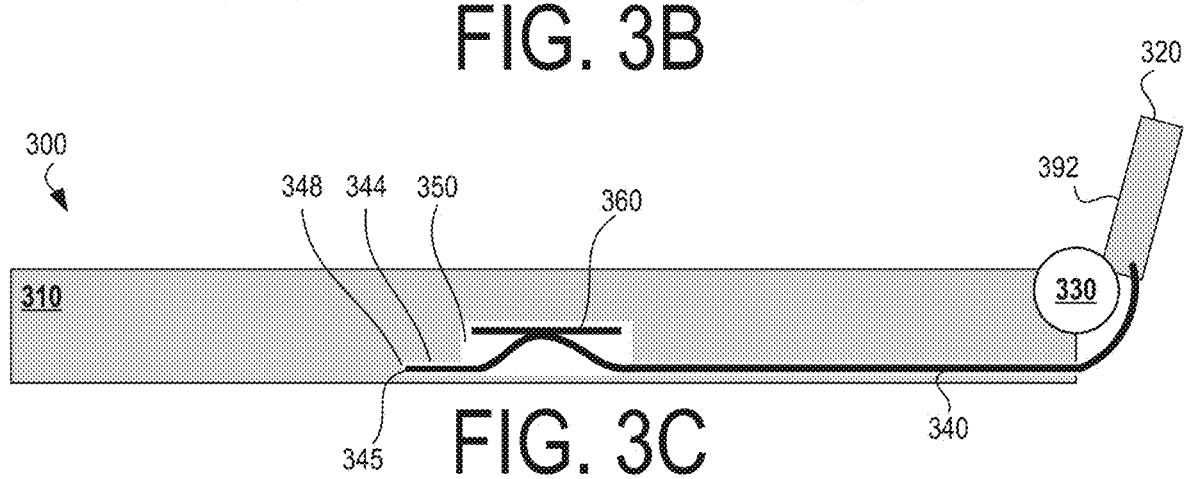
FIGS. 3C and 3D show side and front cross-sectional views, respectively, of the fourth exemplary computing device with the lid opened.
Figure 3D:
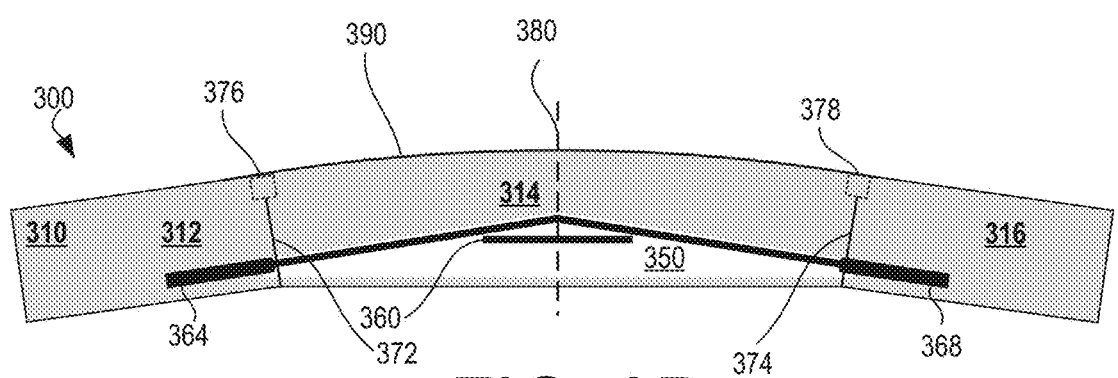

FIGS. 3A and 3B show side and front cross-sectional views, respectively, of the computing device 300 with the lid 320 closed and FIGS. 3C and 3D show side and front cross-sectional views, respectively, of the computing device 300 with the lid 320 opened. The dynamic curvature of the computing device 300 is enabled by the lifter spring 340 being constrained within the pocket 344 and the interaction between the lifter spring 340 and the bending strap 360. When the lid 320 is closed, the lifter spring 340 does not push up against the bending strap 360 (or does not push up against the bending strap 360 with enough force) to cause the left base portion 312 and the right base portion 316 to be pulled inwards toward the y-axis bisector 380. As such, when the lid 320 is closed, the base 310 (and hence, the computing device 300) is substantially flat.

As the lid 320 is opened, an end 345 of the lifter spring 340 extends further into the pocket 344 until it eventually pushes up against a pocket surface 348. Opening the lid 320 beyond this point causes a portion of the lifter spring 340 to buckle into the cavity 350 and push upwards against a portion of the bending strap 360. As a result, and as illustrated in FIG. 3C, the portion of the bending strap 360 located over the lifter spring 340 is pushed upwards into the cavity 350. As illustrated in FIG. 3D, this bending of the bending strap 360 causes the left base portion 312 and the right base portion 316 to be pulled inward toward the y-axis bisector 380, resulting in the middle base portion 314 to curve. A top surface 390 of the base 310 takes on a curved profile due to the flexibility of the middle base portion 314. The curve of the base 310 and the top surface 390 when the lid 320 is opened is convex with respect to the surface (e.g., a tabletop, a user's lap) upon which the computing device 300 is resting. As part of the inward motion of the left and right base portions 312 and 314, the left base portion 312 flexes at the flexible region 376 relative to the middle base portion 314 and moves into the gap 372 and the right base portion 316 flexes at the flexible region 378 relative to the middle base portion 314 and moves into the gap 374.

The lifter spring 340 can comprise nitinol, spring steel, or any other material that allows the base 310 to be connected to the lid 320 as described and that possesses superelastic properties that allow the lifter spring 340 to be pushed upwards against the bending strap 360 with enough force to cause the base 310 to curve as described when the lid 320 is opened.

In some embodiments, the amount that the lifter spring 340 pushes upwards into the cavity 350 depends on the extent to which the lid 320 is opened. That is, the more the lid 320 is opened, the more the base 310 curves. The point at which the base 310 begins to curve as the lid 320 is opened depends on the distance between an end 345 of the lifter spring 340 and the pocket surface 348 when the lid is closed. The further away the lifter spring end 345 is from the pocket surface 348 when the lid 320 is closed, the more the lid 320 needs to be opened before the base 310 begins to curve.

In other embodiments, the computing device 300 can have multiple left, middle, or right base portions with flexible portions and gaps between adjacent base portions. In embodiments with multiple left base portions and multiple right base portions, the bending strap can be attached or anchored to the outermost left base portion at one end and the outermost right base portion at the other end.

Figure 4A:
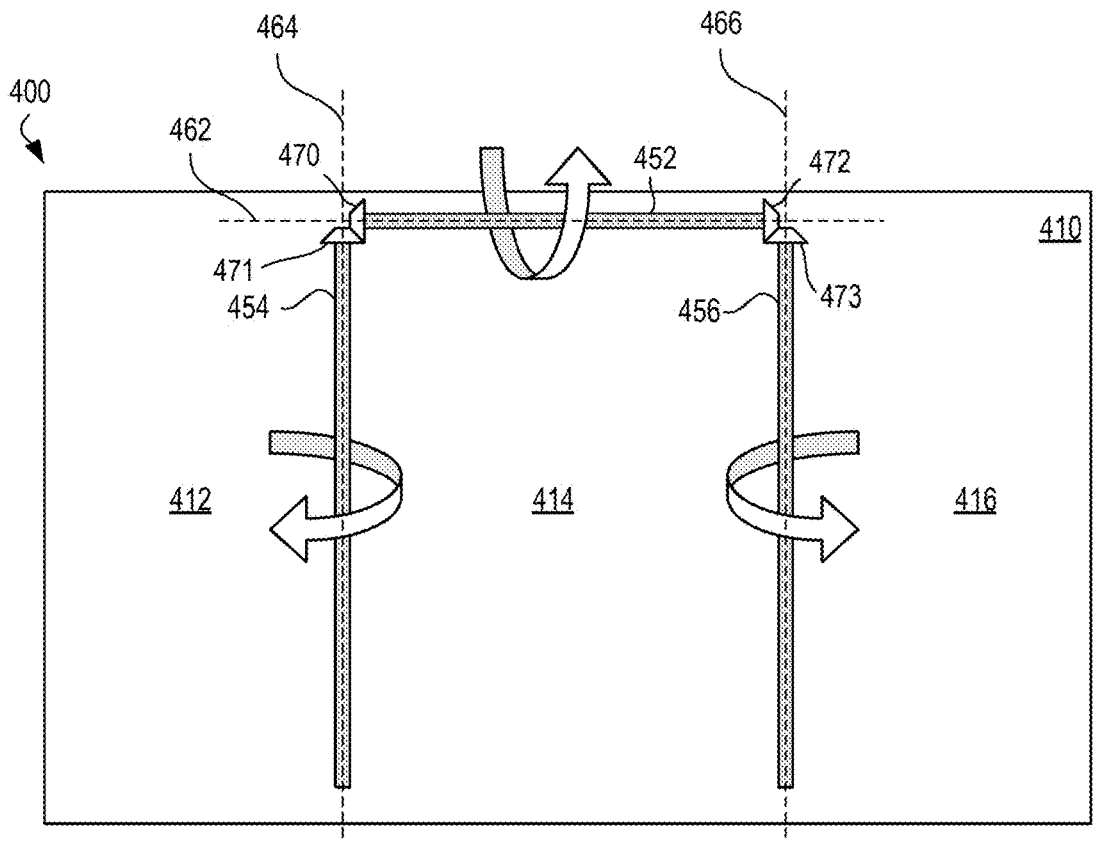
FIG. 4A illustrates a top cross-sectional view of a fifth computing device with dynamic curvature.
Figure 4B:
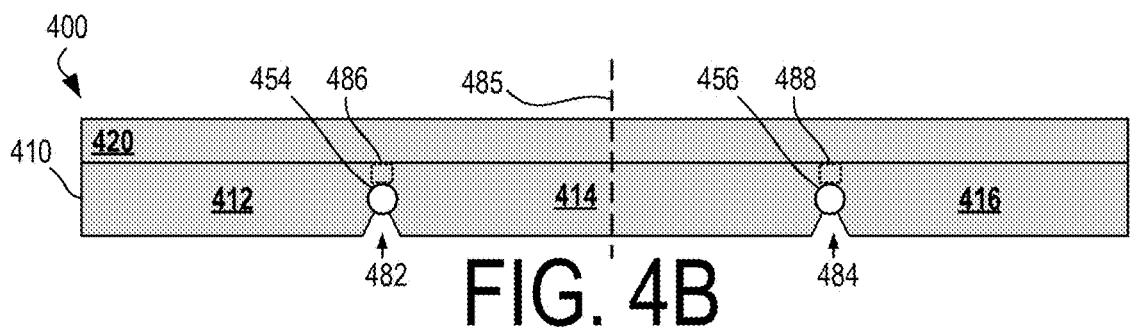
FIGS. 4B and 4C illustrate front cross-sectional views of the fifth computing device with the lid opened and closed, respectively.
Figure 4C:
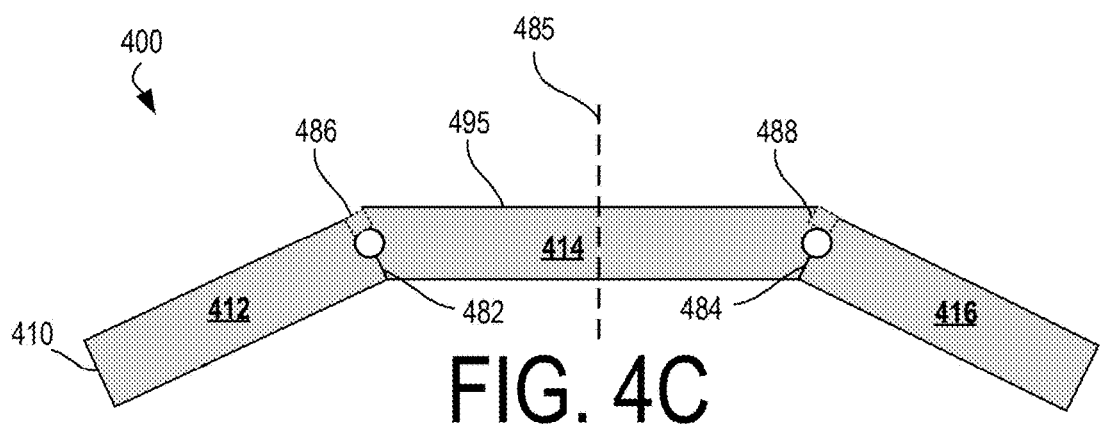

FIGS. 4A-4C illustrate various cross-sectional views of a fifth computing device with dynamic curvature. The computing device 400 illustrated in FIGS. 4A-4C comprises a base 410 rotatably coupled to a lid 420 comprising a display. The base 410 comprises a left base portion 412, a middle base portion 414, and a right base portion 416. The left base portion 412 and the right base portion 416 are rigid and the middle base portion 414 is flexible. The left base portion 412 is rotatably coupled to the middle base portion 414 via a left hinge and the right base portion 416 is rotatably coupled to the middle base portion 414 via a right hinge. The lid 420 is rotatably coupled to the base 410 via a lid hinge.

FIGS. 4A and 4B illustrate top and front cross-sectional views, respectively, of the computing device 400 with the lid 420 closed. The base 410 is substantially flat when the lid 420 is closed. The lid hinge comprises a lid rod 452 that extends along a rotational axis 462 of the lid hinge, the left hinge comprises a left rod 454 that extends along a rotational axis 464 of the left hinge, and the right hinge comprises a right rod 456 extending along a rotational axis 466 of the right hinge. The lid rod 452 engages with the left rod 454 and the right rod 456 via beveled gears 470 and 472 located at left and right ends of the lid rod 452, respectively. The left beveled gear 470 engages with a beveled gear 471 located at an end of the left rod 454 and the right beveled gear 472 of the lid rod 452 engages with a beveled gear 473 located at an end of the right rod 456. The base 410 further comprises gaps 482 and 484 and flexible portions 486 and 488, which, in addition to the left and right hinges and the left and right rods 454 and 456, allow the left base portion 412 and the right base portion 416 to rotate inwards toward a y-axis bisector 485 of the base 410 as the lid 420 is opened.

FIG. 4C illustrates a front cross-sectional view of the computing device 400 with the lid 420 opened. The dynamic curvature of the computing device 400 is enabled by the interactions of the lid rod 452 with the left rod 454 and the right rod 456 via the beveled gear pairs 470-471 and 472-473. As the lid 420 is opened, the lid rod 452 rotates and the beveled gear pair 470-471 causes the left rod 454 to rotate counterclockwise and the beveled gear pair 472-473 causes the right rod 456 to rotate clockwise. The rotation of the left rod 454 and the right rod 456 act to rotate the left base portion 412 and the right base portion 416 inward toward the y-axis bisector 485, resulting in the middle portion 414 of the base 410 being lifted and the base 410 and a top surface 495 of the base 410 taking on a curved profile. The curved profile of the base 410 and the top surface 495 are convex with respect to the surface upon which the computing device 400 is resting.

As part of the inward motion of the left and right base portions 412 and 416 as the lid is opened, the left base portion 412 flexes at the flexible region 486 relative to the middle base portion 414 and moves into the gap 482 and the right base portion 416 flexes at the flexible region 488 relative to the middle base portion 414 and moves into the gap 484. As used herein, the phrase "curved" as used to describe the profile of a surface, component (e.g., base, base portion), or device includes smooth profiles and surfaces, such as the top surface 390 of the base 310 in FIG. 3D and less smooth profiles, such as the top surface 495 of the base 410 in FIG. 4C. As used herein, the term "convex" is used to describe any type of curved surface or profile, as the term "curved" is used herein. Thus, the base 410 and the top surface 495 of the base have a convex profile.

Although the lid rod 452 is shown in FIG. 4A as being physically coupled to the left and the right rods 454 and 456 by sets of beveled gears, other types of gears can be used in other embodiments. For example, in some embodiments, the lid rod can be physically coupled to the left rod and the right rod using worm gears or any other type of gears that can translate power across intersecting rotational axes, such the rotational axis of the lid rod 452 and the rotational axis of the left rod 454 or the right rod 456.

In some embodiments, the amount of curvature of the base 410 depends on the extent to which the lid 420 is opened. That is, the more that the lid 420 is opened, the more the base 410 curves. The amount that the base 410 curves as the lid 420 is opened can depend on the ratio of the diameters of the lid rod 452 to the left rod 454 and the right rod 456. For example, the smaller the ratio between the diameter of the lid rod 452 to the diameter of the left rod 454 and the right rod 456, the more the base 410 curves as the lid 420 is opened.

Figure 5A:
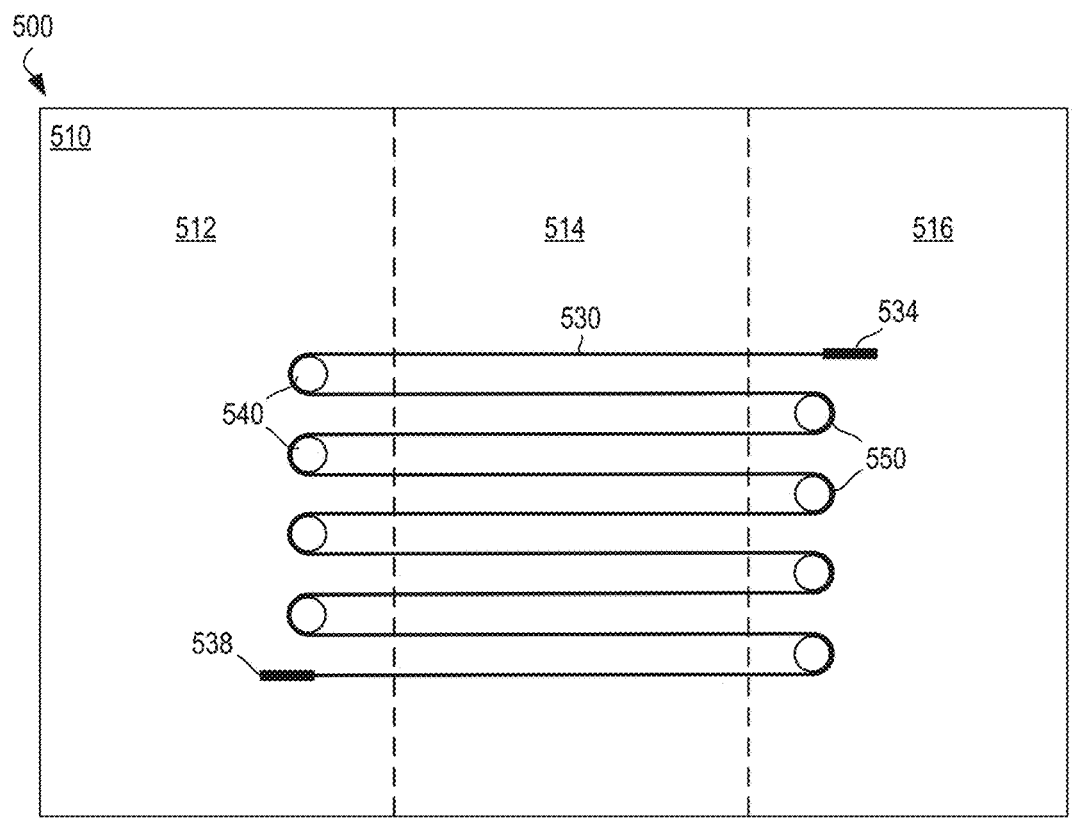
FIGS. 5A-5C illustrate various cross-sectional views of a sixth exemplary computing device with dynamic curvature.
Figure 5B:
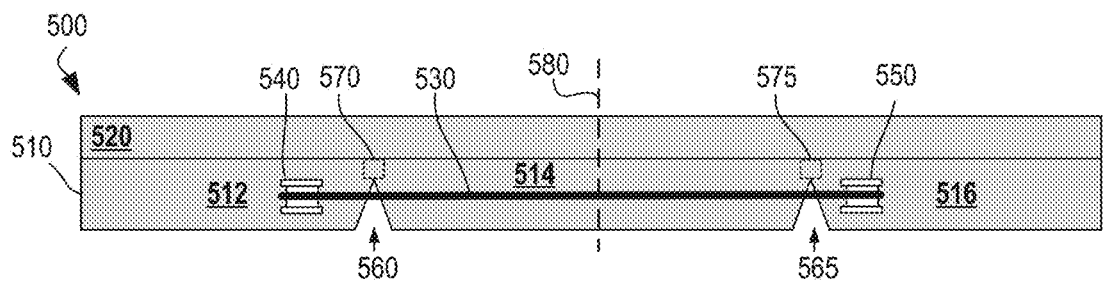
Figure 5C:
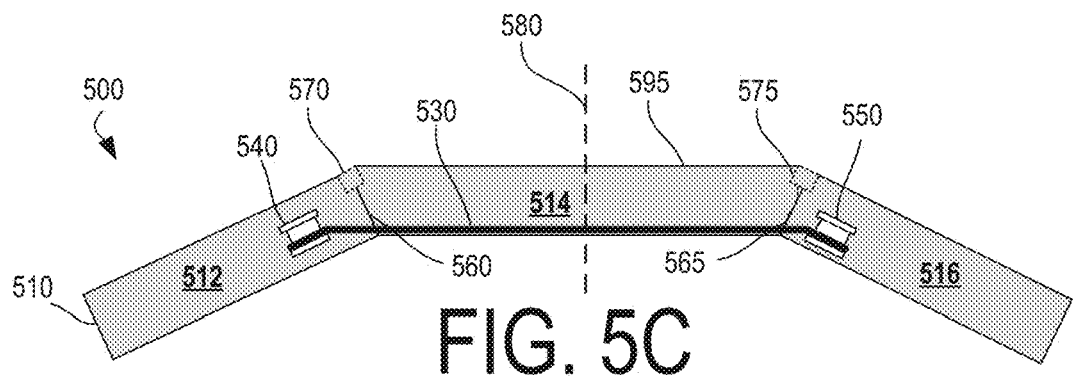

FIGS. 5A-5C illustrate various cross-sectional views of a sixth exemplary computing device with dynamic curvature. The computing device 500 comprises a base 510 and a lid 520 rotatably attached to the base 510. The base 510 comprises a left portion 512, a middle portion 514, and a right portion 516. The left base portion 512 comprises left pulleys 540 and the right base portion 516 comprises right pulleys 550. Each pulley has a rotational axis substantially orthogonal to the surface of the base 510 when the base 510 is substantially flat. The base 510 further comprises a wire 530 attached or anchored at a first end of the wire 534 to the right base portion 516 and attached or anchored at a second end 538 to the left base portion 512. The wire 530 is further laced between the left pulleys 540 and the right pulleys 550 by being alternatively wrapped around individual left pulleys 540 and individual right pulleys 550. The base further comprises gaps 560 and 565 and flexible portions 570 and 575 that allow the left and right base portions 512 and 516 to flex with respect to the middle base portion 514 and to be pulled inwards to a y-axis bisector 580 of the base 510 as the lid 520 is opened. The wire 530 comprises a shape memory alloy (SMA), such as nitinol, that contracts lengthwise as it is heated.

FIGS. 5A and 5B show cross-sectional top and front views, respectively, of the computing device 500 with the lid 520 closed. The base 510 is substantially flat when the lid 520 is closed. The dynamic curvature of the computing device 500 is enabled by the wire 530 contracting lengthwise in response to being heated by the computing device. As the length of the wire 530 contracts, the left base portion 512 and the right base portion 516 are pulled inward toward the y-axis bisector 580, causing the middle portion 514 to raise and cause the base 510 and a top surface 595 of the base 510 to curve. Unlike the computing devices 300 and 400 in FIGS. 3A-3D and 4B-4C, the curving of the base 510 is not due to a physical coupling between the lid 520 and the base 510. Rather, the wire 530 can be heated independently from the lid 520 opening or closing (although the wire 530 could be heated by the computing device in response to the computing device 500 detecting the lid 520 being opened), which enables the computing device to curve the base 510 under various conditions or in response to various events.

FIG. 5C illustrates a cross-sectional front view of the base 510 being curved in response to the wire 530 being heated. The left base portion 512 and the right base portion 516 are pulled inwards toward the y-axis bisector 580. As part of the inward motion of the left base portion 512 and the right base portion 516, the left base portion 512 flexes at the flexible region 570 relative to the middle base portion 514 and moves into the gap 560 and the right base portion 516 flexes at the flexible region 575 relative to the middle base portion 514 and moves into the gap 565.

The wire 530 can be heated in various fashions, such as by one or more dedicated heating elements in the base 510 or by the passing of an electric current through the wire 530. The computing device 500 can generate control signals to the heating element to cause the heating element to heat the wire 530. In some embodiments, a variable amount of heat can be applied to the wire 530 by the computing device 500, allowing the base 510 to take on various degrees of curvature. For example, heating the wire 530 to a higher temperature can cause the wire 530 to contract lengthwise by a greater amount, resulting in the left and right base portions 512 and 516 to be pulled inward by a greater amount and causing the base 510 to take on a greater degree of curvature. The amount of curvature of a base of the computing device 500 can depend on the number of pulleys around which the wire 530 is wrapped. In some embodiments, the base of a computing device has more or fewer left pulleys and right pulleys than shown in FIG. 5A. Lacing the wire around a larger number of pulleys can cause a more base curvature for a given wire temperature increase or provide a given amount of base curvature for a lesser wire temperature increase.

In other embodiments, the computing device 500 can have multiple left, middle, or base portions with flexible portions and gaps between adjacent base portions. In embodiments with multiple left base portions and multiple right base portions, the wire 530 can be attached or anchored to the outermost left base portion at one end and the outermost right base portion at the other end and laced around pulleys located in these outermost base portions.

In computing devices where the curving of a base is not the result of a physical coupling between the base and the lid, such as in computing device 500 in FIGS. 5A-5C, the computing device can cause the base to curve in various contexts or in response to various actions or events. In some embodiments, the computing device can cause the base to curve as part of a power-up sequence or routine of the computing device (e.g., as part of a computing device's BIOS (Basic Input/Output System) or operating system), as part of a computing device transitioning from a low-power state to an active state (e.g., waking from a hibernation or sleep state), or in response to the lid being opened. In some embodiments, the computing device can cause the base to curve upon detecting that the lid has been opened by any amount after the lid has been detected to have been opened by more than a threshold amount, or that the lid has been fully opened. In some embodiments, the computing device can cause the base to curve by an amount that depends on an amount that the lid has opened. For example, sensors in the hinge of a computing device can generate sensor data that can be used to determine an amount of lid opening and the computing device can cause the base to curve by an amount that depends on the determined amount of lid opening. In some embodiments, the computing device can cause the base to curve based on a determined identity of a user. The identity of the user can be determined in various fashions, such as via login credentials, face identification based on images captured by one or more cameras of the computing device, or voice identification based on audio captured by a microphone of the computing device. Causing the base to curve based on user identity can comprise accessing a user profile or user settings associated with the user to see if base curvature settings have been set to values indicating that the computing device base is to be curved.

In some embodiments, the computing device can cause the base to curve in response to a particular application or file being opened. For example, the base can be curved in response to an application that typically involves a high degree of keyboard usage (such as a gaming or word processing application) to provide the user with a more ergonomic keyboard configuration. In some embodiments, the computing device can cause the base to curve in response to detecting that the base is overheating. For example, the computing device can detect that a temperature of the base of the device, which can be provided by, for example, one or more processing components of the computing device or one or more dedicated temperature sensors, has exceeded a temperature threshold and cause the base to take on a curved (or more curved) profile to allow for increased airflow beneath the device. In some embodiments, the computing device can cause the base to curve in response to an environmental temperature provided by one or more thermal sensors of the computing device for measuring a temperature of the computing device's environment exceeding an environmental temperature threshold.

In some embodiments, the computing device causes the base to curve in response to user input received at the computing device indicating that the base is to take on a curved profile. Thus, the user can customize the curvature of the base to suit the user's preferences. For example, a computing device can provide one or more user-configurable computing devices settings that are associated with the curvature of the base to a user. In some embodiments, the computing device can allow the user to select one of two base curvature profiles, curved or flat. That is, the base can only take on one curved profile. In other embodiments, the computing device can allow the user to select from several base curvature options, and in still other embodiments, the user can select whether to increase or decrease the curvature of the base or enter a desired amount of curvature. A user's base curvature (as well as display curvature, if the computing device display has a dynamic curvature) preferences can be stored in a user profile. When the user next logs into the computing device the curvature of the base can be set to the base curvature indicated by the user's profile. Using a computing device having a base and/or display curvature that meets user preferences results in an improved user experience.

The computing device can also reduce the amount of base curvature or cause the base to flatten in various contexts or in response to various events or actions. For example, the computing device can cause the device to flatten as part of the computing device powering off, as part of transitioning from an active state to a low-power state, or in response to the lid being closed. In some embodiments, the curvature of the base can be reduced in response to detecting that the opening of the lid has reduced by an amount but remains open. The computing device can cause the base to flatten in response to a particular application or file being closed. For example, a curved base can return to a flat state when an application typically involving a high degree of keyboard usage is closed. In some embodiments, the curvature of the base can be reduced, or the base can be caused to flatten in response to the computing device base cooling off. For example, the computing device can detect that a temperature of the base has fallen below a temperature threshold and cause the device to take on a less curved or flat profile in response. In some embodiments, the computing device can cause the base to flatten in response to a user logging off.

In the context of the computing device 500, increasing or decreasing the curvature of the base in the contexts or in response to the events described above involves heating the wire or allowing the wire to cool. As described above, heating the wire causes the base to become curved, and the amount of curvature can depend on the amount of heat being applied. The curvature of a base can be reduced by reducing the amount of heat applied to the wire or ceasing heating the wire and the base can be caused to take on a flat profile by reduction or removal of heat applied to the wire. In some embodiments, the approach used to give the computing device 500 its dynamic curvature (a shape memory alloy wire laced around pulleys that allow portions of the base to be pulled inwards when the wire is heated) can be utilized in peripherals, such as stand-alone keyboards. A stand-alone keyboard with dynamic curvature can receive control signals from a computing device communicatively coupled to the keyboard to cause the wire to be heated to cause the keyboard to curve.

In some embodiments, the base of any computing device disclosed herein can comprise a flexible display that extends at least partially across the surface of the base. When the lid is closed, the flexible display is substantially flat and when the lid is opened at least a portion of the flexible display is curved. Additionally, in some embodiments, the base of any computing device disclosed herein can comprise a flexible keyboard that extends at least partially over the surface of the base. When the lid is closed, the keyboard is substantially flat and when the lid is opened at least a portion of the keyboard is curved.

The organization of computing device components in any of the computing devices described herein can be distributed as illustrated in FIGS. 2A and 2B. That is, in some embodiments, a battery is located in a left base portion or right base portion and a printed circuit board comprising additional computing device components is located in a right base portion or left base portion. In other embodiments, computing device components (e.g., processors, memory, network interface controllers, storage) are distributed across one or more rigid portions of a rigid flex PCB. The rigid components of the rigid flex PCB are located in the left and right base portions with rigid flex interconnections extending across one or more middle base portion to connect the computing device components.

Figure 6A:
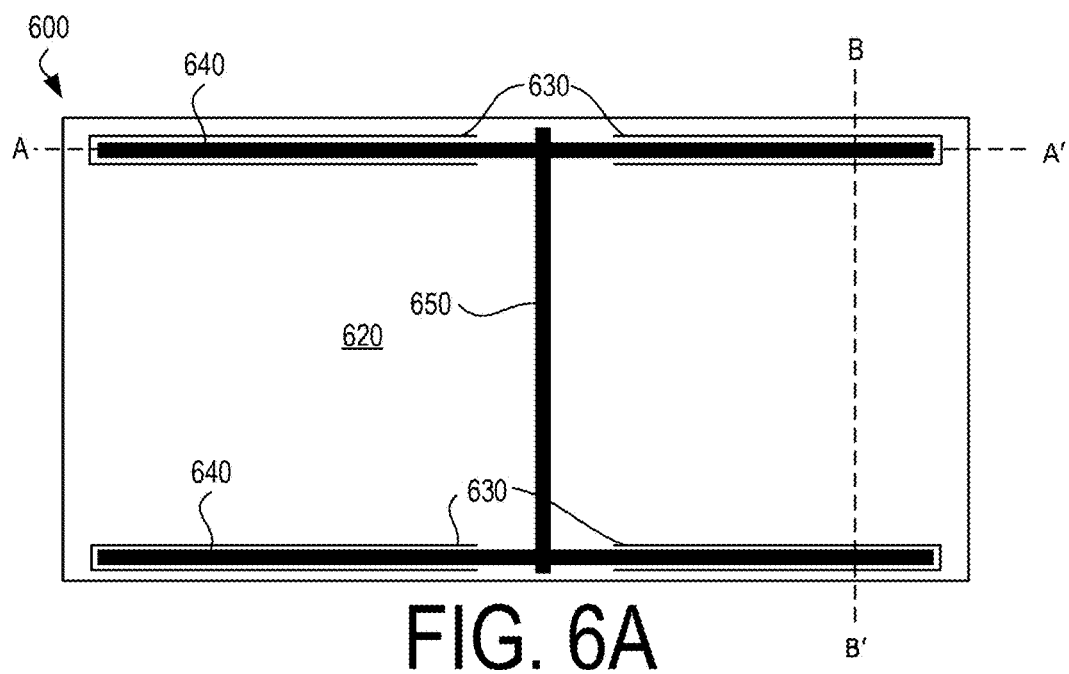
FIGS. 6A-6C illustrate various views of a first exemplary display device with dynamic curvature.
Figure 6B:
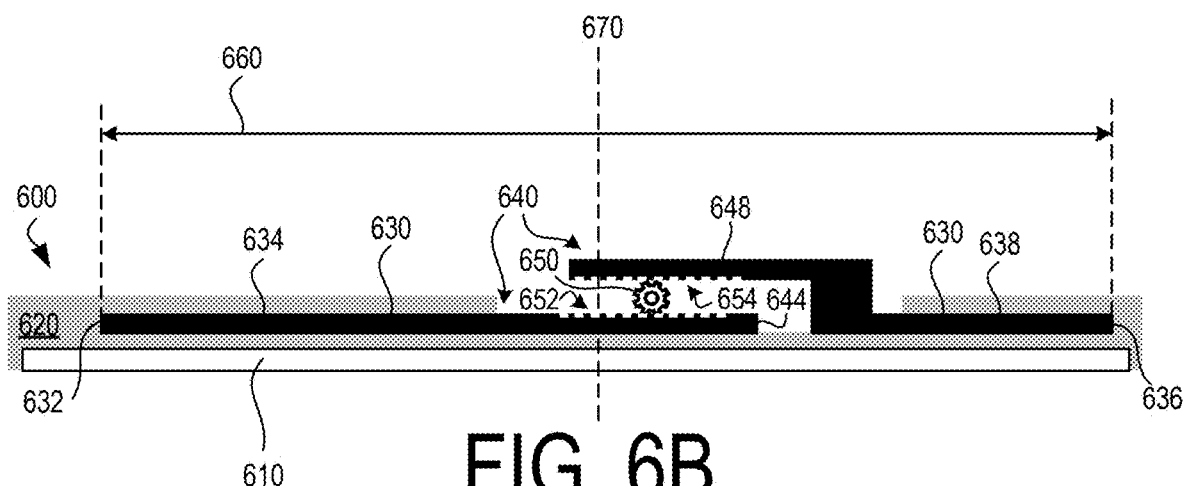
Figure 6C:
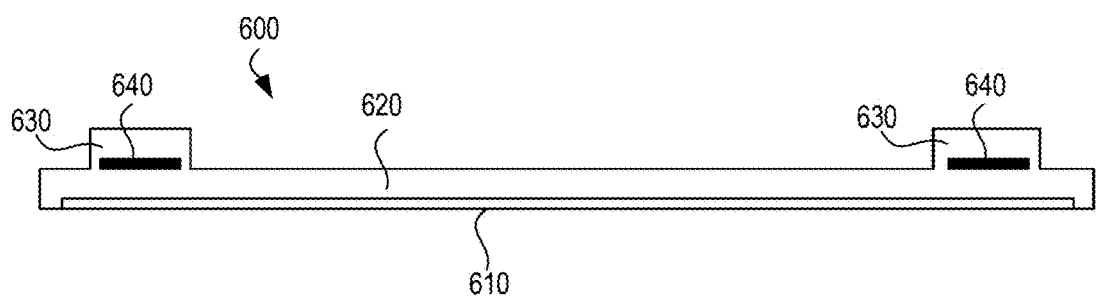

FIGS. 6A-6C illustrate various views of a first exemplary display device with dynamic curvature. FIG. 6A illustrates a rear view of a display device in a flat configuration. FIGS. 6B and 6C illustrate cross-sectional views taken along the lines A-A' and B-B' of FIG. 6A, respectively. The display device 600 comprises a flexible display 610 and a flexible display support 620. The support 620 comprises two slots 630 with each slot 630 comprising a first slot portion 634 and a second slot portion 638. Each slot 630 houses an adjustable strip 640 and each slot 630 comprises a first slot portion 634 that at least partially houses a first strip portion 644 of an adjustable strip 640 and a second slot portion 638 that at least partially houses a second strip portion 648 of an adjustable strip 640. The second strip portion 648 has a stepped profile, partially overlaps the first strip portion 644 and is physically coupled to the first strip portion 644 by a gearwheel 650. The gearwheel 650 engages with a linear gear 652 of the first strip portion 644 and a linear gear 654 of the second strip portion 648 to provide a rack and pinion linear actuator for extending or retracting the adjustable strips 640. The flexible display support 620 is at least flexible enough to accommodate the range of flex in the flexible display 610 induced by the adjustable strips 640 extending to their longest length. In some embodiments, the display device 600 can comprise more than the two slots 630 and adjustable strips 640 illustrated in FIG. 6B. In some embodiments, the adjustable strip 640 can be lengthened and shortened by mechanisms other than a gearwheel.

The dynamic curvature of the display device 600 is enabled by the gearwheel 650 rotating in a first rotational direction to extend a length 660 of the adjustable strips 640 and in a second rotational direction opposite to the first rotational direction to reduce the length 660 of the adjustable strips 640. As the gearwheel 650 rotates clockwise (as viewed from the top of the display device 600), the amount of overlap between the first strip portion 644 and the second strip portion 648 reduces and the length 660 of the adjustable strip 640 increases. As the first strip portion 644 exerts an axial force against an interior end 632 of the first slot portion 634 and the second strip portion 648 exerts an axial force against an interior end 636 of the second slot portion 638, the outer ends of the display device are pushed inwards towards an x-axis bisector 670 of the display device. To flatten or reduce the curvature of the display device 600 in a curved configuration, the gearwheel 650 is caused to rotate counterclockwise. As the gearwheel 650 rotates counterclockwise, the length of the adjustable strips 640 shorten and the ends of the display device 600 are pulled back to flatten or reduce the curvature of the display device 600.

In some embodiments, the display device 600 is a lid or incorporated into a lid of a computing device, the lid being rotatably coupled to the computing device base. In some embodiments, the display device 600 is an external monitor communicatively coupled to a computing device. In some embodiments, the display device 600 further comprises a motor that drives the gearwheel 650. In other embodiments, the gearwheel 650 is manually operable, allowing the viewer of the display device 600 to adjust the curvature of the display device 600 by hand.

In embodiments where the gearwheel 650 is controlled by a motor, a computing device can send control signals to the motor to cause the gearwheel 650 to rotate. The ability of a computing device to control the curvature of the display device 600 allows the display device to be curved or flattened depending on the context of the computing device or in response to various events or actions. In some embodiments, a computing device can cause the display device 600 to curve based on user input received at the computing device indicating that the display device is to take on a curved profile. For example, a computing device can provide one or more user-configurable computing devices settings that are associated with the curvature of the display device to a user. In some embodiments, the computing device can allow the user to select one of two display device curvature profiles, curved or flat. That is, the display device can take on one curved profile. In other embodiments, the computing device can allow the user to select from several pre-configured display device curvature options, and in still other embodiments, the user can be provided the options of whether to increase or decrease the curvature of the display device or enter a desired amount of curvature.

In some embodiments, the computing device can cause the display device to curve in response to opening a particular application or file, such as those being having a file-level, application-level, or system-level setting indicating that the file or application has restricted access to increase privacy. Viewing an application or a file on a curved screen makes it less likely that a bystander can view the application or file. Restricted access can reflect that users having a particular role, belonging to an access list or group, or have another associated property that can be used to limit access to an application or file to fewer than all possible users.

In some embodiments, the display device is incorporated into a head-mounted display (HMD). The curvature of the display device can be adjusted to allow for a better fit of an HMD to a user's head. The curvature of the display device in an HMD can be adjusted through manual adjustment of the gearwheel or by the HMD providing control signals to a motor that controls the gearwheel. In some embodiments, an HMD can adjust the curvature of the display device automatically to fit a user's head or be based on user input supplied to the HMD. In some embodiments, one or more pressure sensors located in the HMD can provide sensor data that reflect the amount of pressure of the HMD against the user's head, the HMD can determine a curved profile for the display device to take based on the pressure sensor data to provide an improved fit of the HMD to the user's head, and adjust the curvature of the HMD.

In some embodiments, a computing device can comprise a base with dynamic curvature and a lid comprising a flexible display with dynamic curvature. For example, a computing device can comprise a base comprising any of the dynamic base curvature technologies disclosed herein and a lid comprising a display device comprising any of the dynamic display device technologies disclosed herein. The curvature of the base and the curvature of the lid in such devices can be independently controlled. That is, the curvature of the base can be different than the curvature of the lid.

Figure 7:
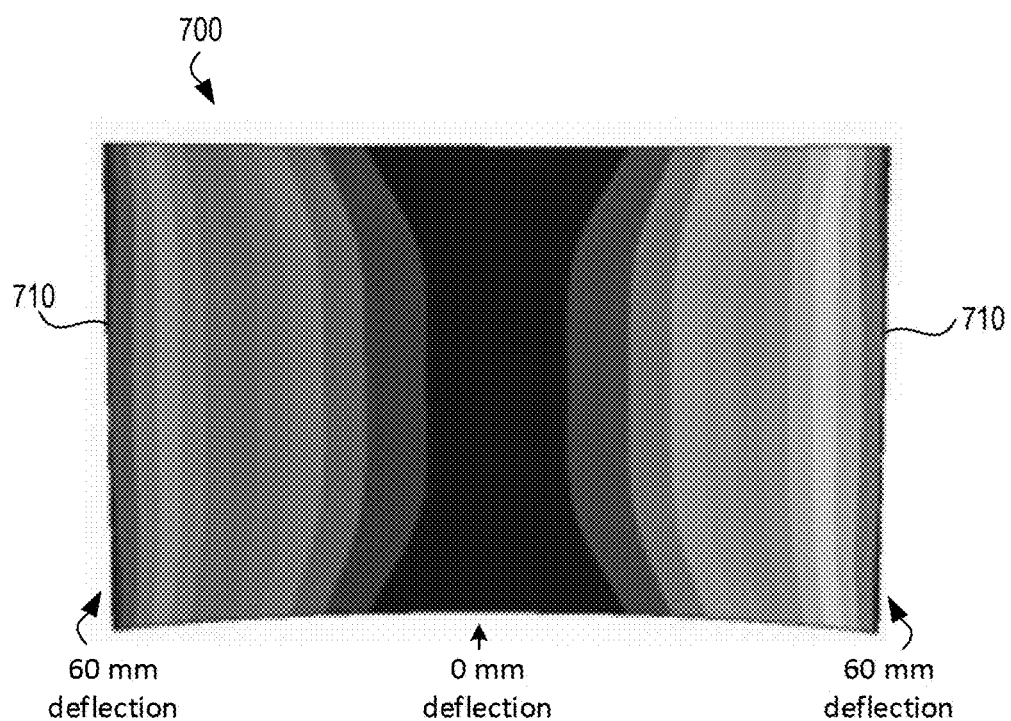
FIG. 7 illustrates the simulated deflection of a second exemplary display device with dynamic curvature.

FIG. 7 illustrates a simulated deflection of a second exemplary display device with dynamic curvature. A display device deflection profile 700 illustrates the simulated results of a maximum amount of deflection of a display device having dynamic curvature enabled by the approach illustrated in FIGS. 6A-6C. The shaded bands reflect different amounts of deflection relative to a flat profile of the display. The simulated display device is 17" in size, has two adjustable strips, and is 4 mm thick (not accounting for the thickness of the adjustable strips and their associated housings). The simulated results show that a result of an axial force of 37.5 N applied by each of two adjustable strips against their housings results in an inward deflection of 60 mm at edges 710 of the display device. Display devices with more than two adjustable strips could have a smoother deflection profile than the deflection profile 700.

While the technologies disclosed herein can be used in any kind of computing device disclosed or referenced herein, they may be particularly useful in computing devices that have thicker or larger bases, such as high-performance laptops. For example, the technologies disclosed herein could be used in high-end gaming laptops or high-end laptops designed for content creation. In addition to being used in computing devices with displays, such as laptops and HMDs, the technologies disclosed herein can be used in peripherals such as stand-alone keyboards.

Figure 8:
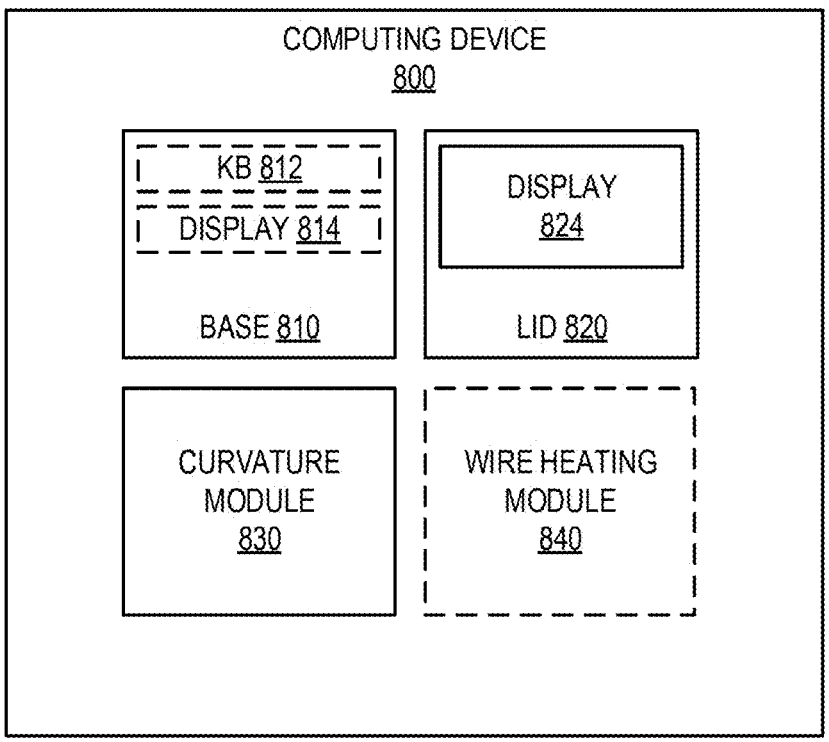
FIG. 8 illustrates a block diagram of a seventh exemplary computing device with dynamic curvature components.

FIG. 8 illustrates a block diagram of a seventh exemplary computing device with dynamic curvature components. The computing device 800 can comprise any of the technologies disclosed herein. The computing device 800 comprises a base 810, a lid 820, and a curvature module 830. The base 810 is a base with dynamic curvature and can comprise a flexible keyboard 812, a flexible display 814, or a combination of the two. The lid 820 comprises a display 824 which, in some embodiments, can be a flexible display with dynamic curvature. The curvature module 830 can cause the base 810 to curve. In embodiments where the lid 820 is a lid with dynamic curvature, the curvature module can also cause the lid to curve. The curvature module can cause a curvature of the base 810 to change based on a context of the computing device or in response to events occurring at the computing device, such as the lid 820 being opened or closed, the computing device exiting or entering a low-power state, be based on the identity of a user, in response to an application or file being opened or closed, and a temperature of the base exceeding or falling below a threshold temperature. In some embodiments, where the dynamic curvature of the base 810 is enabled by the wire-and-pulley arrangement of FIGS. 5A-5C, the computing device 800 can comprise a wire heating module 840 that generates control signals to control a heating element that heats the wire or that causes an electric current to flow through the wire. Of course, FIG. 8 shows just a few of the components in a computing device that can comprise any of the technologies disclosed herein and the computing device would contain additional components such as one or more processors, memory, storage, I/O (Input/Output) devices, an operating system, etc. Some such additional components are disclosed in FIG. 11.

It is to be understood that FIG. 8 illustrates one example of a set of modules that can be included in a computing device. In other embodiments, a computing device can have more or fewer modules than those shown in FIG. 8. Further, separate modules can be combined into a single module, and a single module can be split into multiple modules. Moreover, any of the modules shown in FIG. 8 can be part of the operating system of the computing device 800, one or more software applications independent of the operating system, or operate at another software layer. The modules shown in FIG. 8 can be implemented in software, hardware, firmware, or combinations thereof. A computer device referred to as being programmed to perform a method can be programmed to perform the method via software, hardware, firmware, or combinations thereof.

FIG. 9 illustrates an exemplary method for controlling the curvature of a computing device base. The method 900 can be performed by a laptop with a base with dynamic curvature. At 910, the temperature of a wire in the base of a computing device can be increased or decreased to change a curvature of the base of the computing device. In some embodiments, the method 900 can have additional actions, such as causing the computing device to execute a power-up process, causing the computing device to exit a low-power state, detecting the opening of a lid of the computing device, opening a file or application, detecting a base temperature exceeding a threshold temperature, or receiving user input indicating that the user desires the curvature of the base to increase. The temperature of the wire in 910 can be increased as part of the power-up process or exiting the low-power state; or in response to detecting the opening of the lid, opening the file or application, detecting the base temperature exceeding the threshold temperature, or receiving the user input.

In other embodiments, the method 900 can comprise additional actions such as causing the computing device to execute a power-off process, causing the computing device to enter a low-power state, causing the computing device to execute a logoff process, detecting the closing of a lid of the computing device, closing a file or application, detecting a base temperature falling below a threshold temperature, or receiving user input indicating that the user desires the curvature of the base to decrease. The temperature of the wire in 910 can be decreased as part of the power-off process, logoff process, or entering the low-power state; or in response to detecting the closing of the lid, the closing of the file or application, detecting the base temperature falling below the threshold temperature, or receiving the user input.

Figure 10:
FIG. 10 illustrates an exemplary method for controlling a display device with dynamic curvature.

FIG. 10 illustrates an exemplary method for controlling a display device with dynamic curvature. The method 1000 can be performed by a laptop with a lid that has a dynamic curvature. At 1010, a gearwheel is rotated to extend or decrease the length of one or more adjustable strips in a display device to change a curvature of the display device. In some embodiments, the method 1000 can have additional actions, such as causing the computing device to execute a power-up process, causing the computing device to exit a low-power state, detecting the opening of the lid, opening a file or application, or receiving user input indicating that the user desires the curvature of the flexible display to increase. The temperature of the wire in 910 can be increased as part of the power-up process or exiting the low-power state; or in response to detecting the opening of the lid, opening the file or application, or receiving the user input.

In other embodiments, the method 1000 can comprise other additional actions such as causing the computing device to execute a power-off process, causing the computing device to enter a low-power state, causing the computing device to execute a logoff process, detecting the closing of a lid of the computing device, closing a file or application, or receiving user input indicating that the user desires the curvature of the lid to decrease. The temperature of the wire in 910 can be decreased as part of the power-off process, logoff process, or entering the low-power state; or in response to detecting the closing of the lid, closing of the file or application, or receiving the user input.

The dynamic curvature technologies disclosed herein provide at least the following advantages. The base and/or a display of a computing device can take on a curved profile while the computing device is being operated and take on a flat profile while the computing device is stored. This allows for computing devices to have both of the benefits of providing a computing device with improved ergonomics over a flat computing device when the device is in use and having a flat profile that makes the computing device easy to be stowed. A curved base provides a user with a more ergonomic keyboard experience as a curved keyboard can reduce the strain on a user's wrist and a curved display can reduce eye strain by reducing the variation in the distance from the eye to the display over the width of the display. Further, how much a display or base is curved can be user-configurable, allowing for a user to tune the curvature of the base or display to suit their preferences. Moreover, a curved computing device base can provide for improved thermal management of a computing device. A curved base can introduce an air gap between the base and the surface upon which the computing device is resting, which can result in improved cooling of the device.

The technologies, techniques, and embodiments described herein can be performed by any of a variety of computing devices, including mobile devices (e.g., smartphones, handheld computers, tablet computers, laptop computers, media players, portable gaming consoles, cameras and video recorders), non-mobile devices (e.g., desktop computers, servers, stationary gaming consoles, set-top boxes, smart televisions) and embedded devices (e.g., devices incorporated into a vehicle, home or place of business). As used herein, the term "computing devices" includes computing systems and includes devices comprising multiple discrete physical components.

Figure 11:
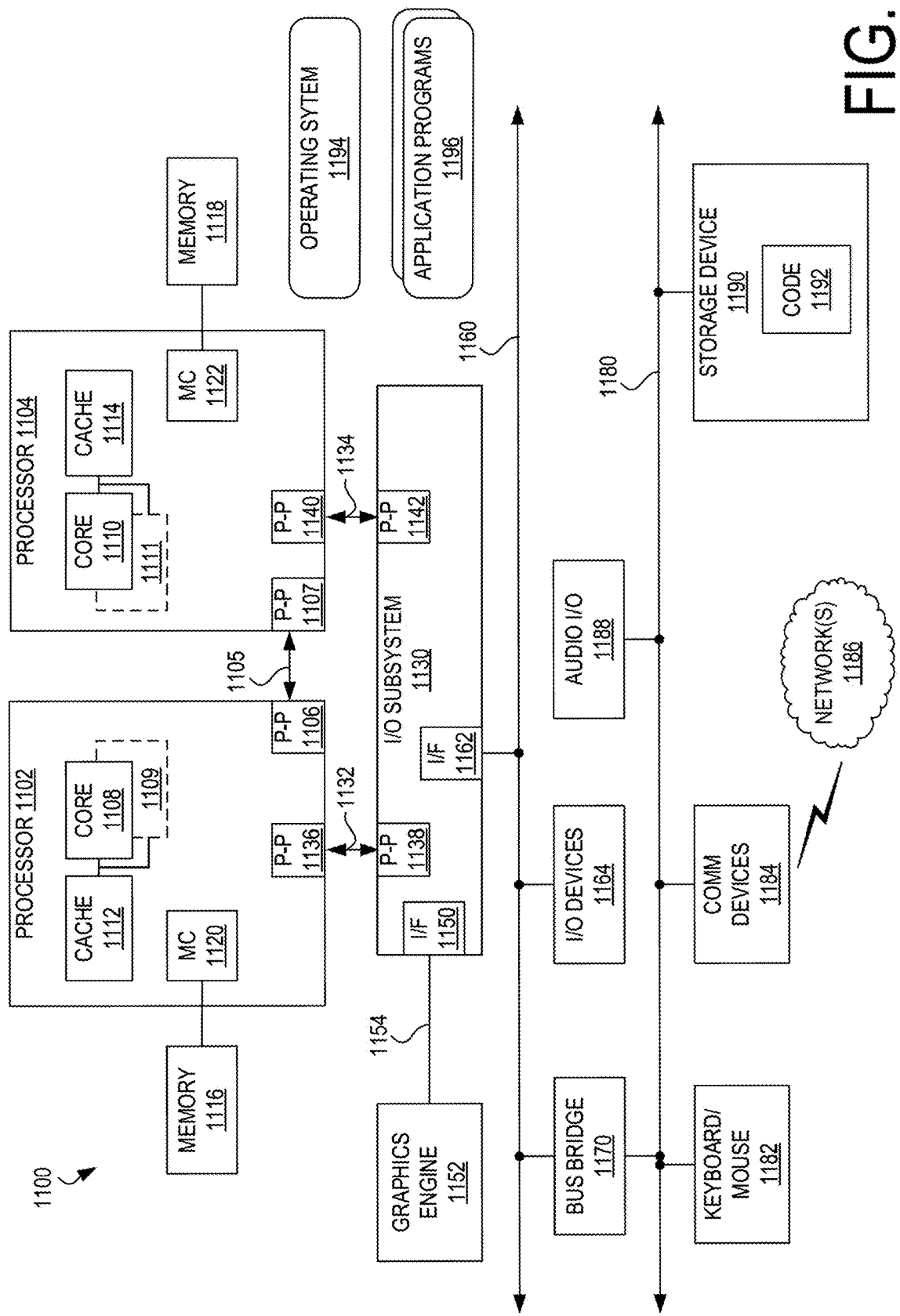
FIG. 11 is a block diagram of an eight exemplary computing device in which technologies described herein may be implemented.

FIG. 11 is a block diagram of an eighth exemplary computing device 1100 in which technologies described herein may be implemented. Generally, components shown in FIG. 11 can communicate with other shown components, although not all connections are shown, for ease of illustration. The device 1100 is a multiprocessor system comprising a first processor 1102 and a second processor 1104 and is illustrated as comprising point-to-point (P-P) interconnects. For example, a point-to-point (P-P) interface 1106 of the processor 1102 is coupled to a point-to-point interface 1108 of the processor 1104 via a point-to-point interconnection 1105. It is to be understood that any or all of the point-to-point interconnects illustrated in FIG. 11 can be alternatively implemented as a multi-drop bus, and that any or all buses illustrated in FIG. 11 could be replaced by point-to-point interconnects.

As shown in FIG. 11, the processors 1102 and 1104 are multicore processors. Processor 1102 comprises processor cores 1108 and 1109, and processor 1104 comprises processor cores 1110 and 1111. Processor cores 1108-1111 can execute computer-executable instructions in a manner similar to that discussed below in connection with FIG. 12, or in other manners.

Processors 1102 and 1104 further comprise at least one shared cache memory 1111 and 1114, respectively. The shared caches 1111 and 1114 can store data (e.g., instructions) utilized by one or more components of the processor, such as the processor cores 1108-1109 and 1110-1111. The shared caches 1111 and 1114 can be part of a memory hierarchy for the device 1100. For example, the shared cache 1111 can locally store data that is also stored in a memory 1116 to allow for faster access to the data by components of the processor 1102. In some embodiments, the shared caches 1111 and 1114 can comprise multiple cache layers, such as level 1 (L1), level 2 (L2), level 3 (L3), level 4 (L4), and/or other caches or cache layers, such as a last level cache (LLC).

Although the device 1100 is shown with two processors, the device 1100 can comprise any number of processors. Further, a processor can comprise any number of processor cores. A processor can take various forms such as a central processing unit, a controller, a graphics processor, an accelerator (such as a graphics accelerator, digital signal processor (DSP), or artificial intelligence (AI) accelerator)). A processor in a device can be the same as or different from other processors in the device. In some embodiments, the device 1100 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 1102 and 1104 reside in the same die package.

Processors 1102 and 1104 further comprise memory controller logic (MC) 1120 and 1122. As shown in FIG. 11, MCs 1120 and 1122 control memories 1116 and 1118 coupled to the processors 1102 and 1104, respectively. The memories 1116 and 1118 can comprise various types of memories, such as volatile memory (e.g., dynamic random access memories (DRAM), static random access memory (SRAM)) or non-volatile memory (e.g., flash memory, solid-state drives, chalcogenide-based phase-change non-volatile memories). While MCs 1120 and 1122 are illustrated as being integrated into the processors 1102 and 1104, in alternative embodiments, the MCs can be logic external to a processor, and can comprise one or more layers of a memory hierarchy.

Processors 1102 and 1104 are coupled to an Input/Output (I/O) subsystem 1130 via P-P interconnections 1132 and 1134. The point-to-point interconnection 1132 connects a point-to-point interface 1136 of the processor 1102 with a point-to-point interface 1138 of the I/O subsystem 1130, and the point-to-point interconnection 1134 connects a point-to-point interface 1140 of the processor 1104 with a point-to-point interface 1142 of the I/O subsystem 1130. Input/Output subsystem 1130 further includes an interface 1150 to couple I/O subsystem 1130 to a graphics engine 1152, which can be a high-performance graphics engine. The I/O subsystem 1130 and the graphics engine 1152 are coupled via a bus 1154. Alternately, the bus 1154 could be a point-to-point interconnection.

Input/Output subsystem 1130 is further coupled to a first bus 1160 via an interface 1162. The first bus 1160 can be a Peripheral Component Interconnect (PCI) bus, a PCI Express bus, another third generation I/O interconnection bus or any other type of bus.

Various I/O devices 1164 can be coupled to the first bus 1160. A bus bridge 1180 can couple the first bus 1160 to a second bus 1180. In some embodiments, the second bus 1180 can be a low pin count (LPC) bus. Various devices can be coupled to the second bus 1180 including, for example, a keyboard/mouse 1182, audio I/O devices 1188 and a storage device 1190, such as a hard disk drive, solid-state drive or other storage device for storing computer-executable instructions (code) 1192. The code 1192 can comprise computer-executable instructions for performing technologies described herein. Additional components that can be coupled to the second bus 1180 include communication device(s) 1184, which can provide for communication between the device 1100 and one or more wired or wireless networks 1186 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 1102.11 standard and its supplements).

The device 1100 can comprise removable memory such as flash memory cards (e.g., SD (Secure Digital) cards), memory sticks, Subscriber Identity Module (SIM) cards). The memory in device 1100 (including caches 1111 and 1114, memories 1116 and 1118 and storage device 1190) can store data and/or computer-executable instructions for executing an operating system 1194 and application programs 1196. Example data includes web pages, text messages, images, sound files, video data, and files sent to and/or received from one or more network servers or other devices by the device 1100 via one or more wired or wireless networks, or for use by the device 1100. The device 1100 can also have access to external memory (not shown) such as external hard drives or cloud-based storage.

The operating system 1194 can control the allocation and usage of the components illustrated in FIG. 11 and support one or more application programs 1196. The application programs 1196 can include common mobile computing device applications (e.g., email applications, calendars, contact managers, web browsers, messaging applications) as well as other computing applications, such as word processing or gaming applications.

The device 1100 can support various input devices, such as a touchscreen, microphone, monoscopic camera, stereoscopic camera, trackball, touchpad, trackpad, mouse, keyboard, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to or removably attachable with the device 1100. External input and output devices can communicate with the device 1100 via wired or wireless connections.

In addition, the computing device 1100 can provide one or more natural user interfaces (NUIs). For example, the operating system 1194 or applications 1196 can comprise speech recognition logic as part of a voice user interface that allows a user to operate the device 1100 via voice commands. Further, the device 1100 can comprise input devices and logic that allows a user to interact with the device 1100 via a body, hand or face gestures.

The device 1100 can further comprise one or more communication components 1184. The components 1184 can comprise wireless communication components coupled to one or more antennas to support communication between the system 1100 and external devices. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 1100 can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; a proximity sensor; and a compass. A GPS receiver can be coupled to a GPS antenna. The device 1100 can further include one or more additional antennas coupled to one or more additional receivers, transmitters and/or transceivers to enable additional functions.

It is to be understood that FIG. 11 illustrates only one exemplary computing device architecture. Computing devices based on alternative architectures can be used to implement technologies described herein. For example, instead of the processors 1102 and 1104, and the graphics engine 1152 being located on discrete integrated circuits, a computing device can comprise a SoC (system-on-a-chip) integrated circuit incorporating multiple processors, a graphics engine and additional components. Further, a computing device can connect elements via bus or point-to-point configurations different from that shown in FIG. 11. Moreover, the illustrated components in FIG. 11 are not required or all-inclusive, as shown components can be removed and other components added in alternative embodiments.

Figure 12:
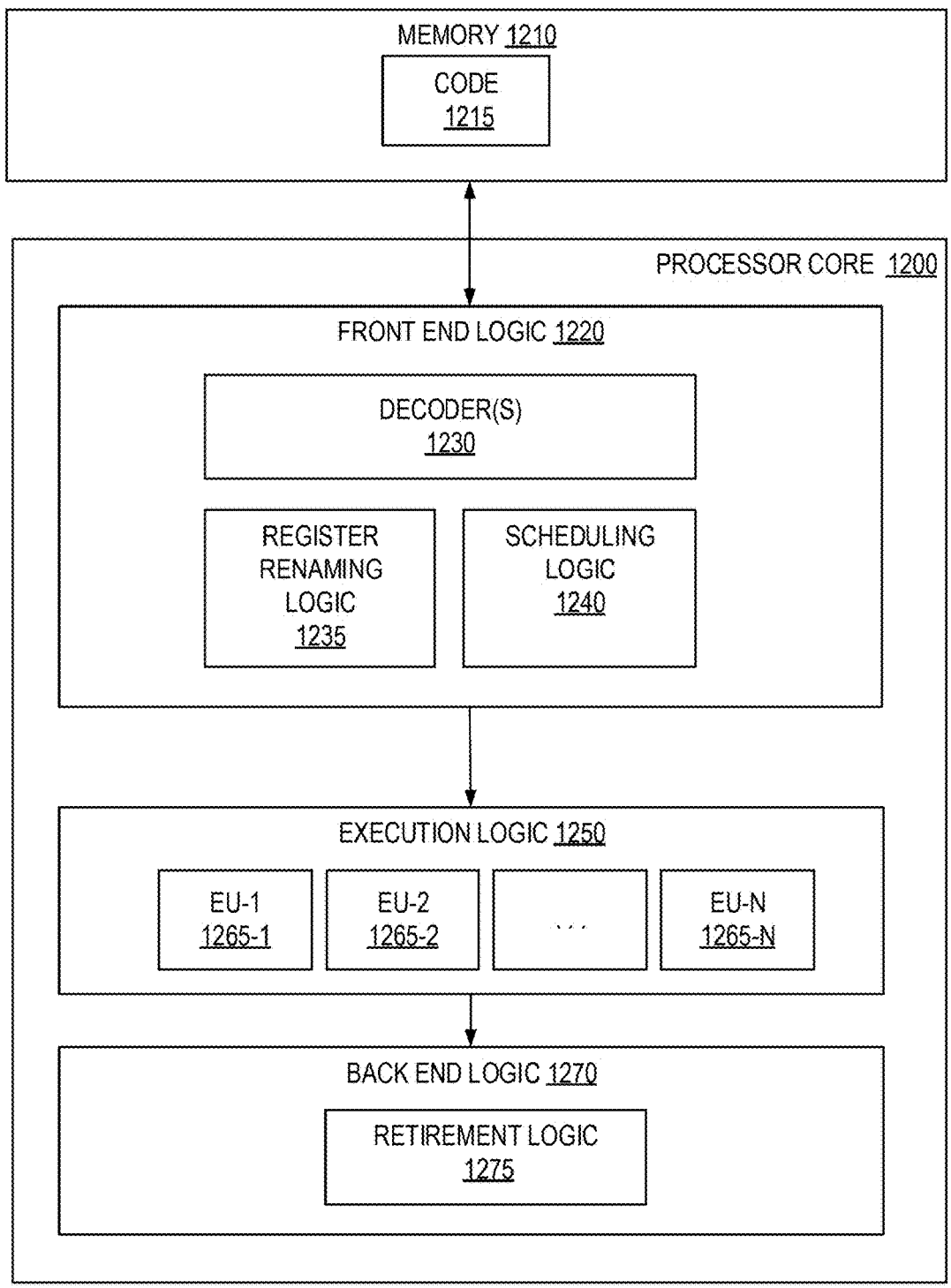
FIG. 12 is a block diagram of an exemplary processor core to execute computer-executable instructions as part of implementing technologies described herein.

FIG. 12 is a block diagram of an exemplary processor core 1300 to execute computer-executable instructions as part of implementing technologies described herein. The processor core 1300 can be a core for any type of processor, such as a microprocessor, an embedded processor, a digital signal processor (DSP) or a network processor. The processor core 1300 can be a single-threaded core or a multi-threaded core in that it may include more than one hardware thread context (or "logical processor") per core.

FIG. 12 also illustrates a memory 1310 coupled to the processor 1300. The memory 1310 can be any memory described herein or any other memory known to those of skill in the art. The memory 1310 can store computer-executable instruction 1315 (code) executable by the processor core 1300.

The processor core comprises front-end logic 1220 that receives instructions from the memory 1210. An instruction can be processed by one or more decoders 1230. The decoder 1230 can generate as its output a micro operation such as a fixed width micro operation in a predefined format, or generate other instructions, microinstructions, or control signals, which reflect the original code instruction. The front-end logic 1220 further comprises register renaming logic 1235 and scheduling logic 1240, which generally allocate resources and queues operations corresponding to converting an instruction for execution.

The processor core 1200 further comprises execution logic 1250, which comprises one or more execution units (EUs) 1265-1 through 1265-N. Some processor core embodiments can include a number of execution units dedicated to specific functions or sets of functions. Other embodiments can include only one execution unit or one execution unit that can perform a particular function. The execution logic 1250 performs the operations specified by code instructions. After completion of execution of the operations specified by the code instructions, back-end logic 1280 retires instructions using retirement logic 1285. In some embodiments, the processor core 1200 allows out of order execution but requires in-order retirement of instructions. Retirement logic 1280 can take a variety of forms as known to those of skill in the art (e.g., re-order buffers or the like).

The processor core 1200 is transformed during execution of instructions, at least in terms of the output generated by the decoder 1230, hardware registers and tables utilized by the register renaming logic 1235, and any registers (not shown) modified by the execution logic 1250. Although not illustrated in FIG. 12, a processor can include other elements on an integrated chip with the processor core 1200. For example, a processor may include additional elements such as memory control logic, one or more graphics engines, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as curvature circuitry or wire heating circuitry. A computer device referred to as being programmed to perform a method can be programmed to perform the method via software, hardware, firmware or combinations thereof.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a computing device, comprising a base comprising a plurality of base portions, the plurality of base portions comprising one or more left base portions, one or more middle base portions, and one or more right base portions; a bending strap attached at a first end of the bending strap to one of the left base portions and attached at a second end of the bending strap to one of the right base portions; a lid comprising a display, the lid rotatably coupled to the base; and a lifter spring attached to the lid and extending into the base; wherein a portion of the lifter spring is to push upwards against a portion of the bending strap to cause the bending strap to bend when the lid is opened, the bending of the bending strap to cause the left base portions and the right base portions to pull inwards toward a y-axis bisector of the base to cause the base to curve.

Example 2 is the computing device of example 1, wherein at least one of the base portions is rigid, the bending of the bending strap to cause the left base portions and the right base portions to pull inwards toward the y-axis bisector of the base comprising individual of the at least one rigid base portions to flex relative to a base portion adjacent to the individual rigid base portion.

Example 3 is the computing device of example 1, wherein at least one of the middle base portions is flexible, the bending of the bending strap to cause the left base portions and the right base portions to pull inwards toward the y-axis bisector of the base comprising individual of the flexible middle base portions to curve.

Example 4 is the computing device of example 1, wherein the base further comprises a cavity and the portion of the lifter spring buckles into the cavity to push upwards against the portion of the bending strap as the lid is opened.

Example 5 is the computing device of example 1, further comprising a hinge to rotatably couple the lid to the base, wherein the lifter spring wraps around the hinge.

Example 6 is the computing device of example 1, wherein the lifter spring comprises nitinol.

Example 7 is the computing device of example 1, wherein the lifter spring comprises spring steel.

Example 8 is the computing device of example 1, wherein the more the lid opens the more the base curves.

Example 9 is the computing device of example 1, wherein the base is substantially flat when the lid is closed.

Example 10 is the computing device of example 1, wherein the base further comprises a flexible display that extends at least partially over the base portions, the flexible display being substantially flat when the lid is closed and at least a portion of the flexible display being curved when the lid is open.

Example 11 is the computing device of example 1, wherein the base comprises a keyboard that extends over one or more of the base portions, the keyboard being substantially flat when the lid is closed and at least a portion of the keyboard being curved when the lid is open.

Example 12 is the computing device of example 1, further comprising a battery and a motherboard, the battery and the motherboard located in base portions other than the middle base portions.

Example 13 is the computing device of example 1, further comprising a plurality of computing device components located in base portions other than the middle base portions.

Example 14 is a computing device, comprising a base comprising a left base portion, a middle base portion, and a right base portion, the left base portion rotatably coupled to the middle base portion via a left hinge and the right base portion rotatably coupled to the middle base portion via a right hinge; and a lid comprising a display, the lid rotatably coupled to the base via a lid hinge, the lid hinge physically coupled to the left hinge and the right hinge to cause the left base portion and the right portion to rotate inward toward a y-axis bisector of the base to cause the base to curve as the lid is opened.

Example 15 is the computing device of example 14, wherein the lid hinge comprises a lid rod extending along a rotational axis of the lid hinge, the left hinge comprises a left rod extending along a rotational axis of the left hinge, and a right rod extending along a rotational axis of the right hinge, the lid rod engaged at a first end of the lid rod with a first end of the left rod and at a second end of the lid rod with a first end of the right rod.

Example 16 is the computing device of example 15, wherein the lid rod comprises a first bevel gear at the first end of the lid rod and a second bevel gear at the second end of the lid rod, the left rod comprises a third gear at the first end of the left rod, the right rod comprises a fourth gear at the first end of the right rod, the lid rod engaging with the left rod via the first bevel gear engaging with the third bevel gear and the lid rod engaging with the right rod via the second bevel gear engaging with the fourth bevel gear.

Example 17 is the computing device of example 14, wherein the more the lid is opened the more the base curves.

Example 18 is the computing device of example 14, wherein the base is substantially flat when the lid is closed.

Example 19 is the computing device of example 14, wherein the base further comprises a flexible display that extends at least partially over the base portions, the flexible display being substantially flat when the lid is closed and at least a portion of the flexible display being curved when the lid is open.

Example 20 is the computing device of example 14, wherein the base comprises a keyboard that extends at least partially over the base portions, the keyboard being substantially flat when the lid is closed and at least a portion of the keyboard being curved when the lid is open.

Example 21 is the computing device of example 14, further comprising a battery and a motherboard, the battery and the motherboard located in base portions other than the middle base portions.

Example 22 is the computing device of example 14, further comprising a plurality of computing device components located in base portions other than the middle base portions.

Example 23 is a computing device, comprising a base comprising a plurality of base portions, the plurality of base portions comprising one or more left base portions, one or more middle base portions, and one or more right base portions; a lid comprising a display, the lid rotatably coupled to the base; and a wire attached at a first end of the wire to one of the left base portions and attached at a second end of the wire to one of the right base portions, the one of the left base portions comprising one or more left pulleys, the one of the right base portions comprising one or more right pulleys, the wire alternatively wrapped around individual of the left pulleys and individual of the right pulleys; wherein the wire contracts lengthwise when heated to cause the left base portions and the right base portions to be pulled inwards toward a y-axis bisector of the base to cause the base to curve.

Example 24 is the computing device of example 23, wherein the wire comprises a shape memory alloy.

Example 25 is the computing device of example 23, wherein individual of the left pulleys and individual of the right pulleys have a rotational axis substantially orthogonal to a top surface of the base when the base is substantially flat.

Example 26 is the computing device of example 23, further comprising one or more processors; and one or more computer-readable storage media having instructions stored thereon that, when executed, cause the one or more processors to cause the wire to be heated to a first temperature to cause the base to curve by a first curvature amount; and cause the wire to be heated to a second temperature greater than the first temperature to cause the base to curve by a second curvature amount greater than the first curvature amount.

Example 27 is the computing device of example 23, further comprising one or more processors; and one or more computer-readable storage media having instructions stored thereon that, when executed, cause the one or more processors to cause the wire to be heated.

Example 28 is the computing device of example 27, further comprising a heating element to heat at least a portion of the wire, wherein to cause the wire to be heated comprises causing the heating element to heat the at least a portion of the wire.

Example 29 is the computing device of example 27, wherein to cause the wire to be heated comprises causing an electric current to be passed through the wire.

Example 30 is the computing device of example 23, further comprising one or more processors; and one or more computer-readable storage media having instructions stored thereon that, when executed, cause the one or more processors to cause the wire to be heated as part of a power-on process of the computing device.

Example 31 is the computing device of example 23, further comprising one or more processors; and one or more computer-readable storage media having instructions stored thereon that, when executed, cause the one or more processors to cause the wire to be heated as part of the computing device exiting a low-power state.

Example 32 is the computing device of example 23, further comprising one or more processors; and one or more computer-readable storage media having instructions stored thereon that, when executed, cause the one or more processors to detect an opening of the lid; and cause the wire to be heated in response to detecting the opening of the lid.

Example 33 is the computing device of example 23, further comprising one or more processors; and one or more computer-readable storage media having instructions stored thereon that, when executed, cause the one or more processors to cause the wire to be heated based on an identify of a user of the computing device.

Example 34 is the computing device of example 23, further comprising one or more processors; and one or more computer-readable storage media having instructions stored thereon that, when executed, cause the one or more processors to cause the wire to be heated in response to an opening of an application.

Example 35 is the computing device of example 23, further comprising one or more processors; and one or more computer-readable storage media having instructions stored thereon that, when executed, cause the one or more processors to cause the wire to be heated in response to an opening of a file by the computing device.

Example 36 is the computing device of example 23, further comprising one or more processors; and one or more computer-readable storage media having instructions stored thereon that, when executed, cause the one or more processors to determine that a temperature of the base has exceeded a temperature threshold; and cause the wire to be heated in response to the temperature of the base exceeding the temperature threshold.

Example 37 is the computing device of example 23, further comprising one or more processors; and one or more computer-readable storage media having instructions stored thereon that, when executed, cause the one or more processors to determine that an environmental temperature has exceeded a temperature threshold; and cause the wire to be heated in response to the environmental temperature exceeding the temperature threshold.

Example 38 is the computing device of example 23, further comprising one or more processors; and one or more computer-readable storage media having instructions stored thereon that, when executed, cause the one or more processors to receive user input indicating that the base of the computing device is to curve; and cause the wire to be heated in response to receiving the user input indicating that the base of the computing device is to curve.

Example 39 is the computing device of example 23, further comprising one or more processors; and one or more computer-readable storage media having instructions stored thereon that, when executed, cause the one or more processors to receiving user input indicating that a curvature of the base is to increase; and cause the wire to be heated in response to receiving the user input indicating that the curvature of the base is to increase.

Example 40 is the computing device of example 23, wherein the wire extends lengthwise when heat is removed from the wire to cause the left base portions and the right portions to extend outwards away from the y-axis bisector of the base to cause a reduction in a curvature of the base, the base being curved as the result of the wire being heated, the device further comprising one or more processors; and one or more computer-readable storage media having instructions stored thereon that, when executed, cause the one or more processors to cease or reduce heating of the wire.

Example 41 is the computing device of example 40, wherein the cease heating or reduce heating of the wire is performed as part of the computing device entering a low-power state.

Example 42 is the computing device of example 40, wherein the cease or reduce heating of the wire is performed in response to detecting the lid being closed.

Example 43 is the computing device of example 40, wherein the cease or reduce heating of the wire is performed in response to a user logging off.

Example 44 is the computing device of example 40, wherein the cease or reduce heating of the wire is performed in response to a closing of an application executing on the computing device.

Example 45 is the computing device of example 40, wherein the one or more computer-readable storage media having instructions stored thereon that, when executed, cause the one or more processors to further detect that a temperature of the base has fallen below a temperature threshold, the cease or reduce the heating the wire being performed in response to detecting that the temperature of the base has fallen below the temperature threshold.

Example 46 is the computing device of example 40, wherein the one or more computer-readable storage media having instructions stored thereon that, when executed, cause the one or more processors to further receive user input indicating that the base is to take on a substantially flat profile, the ceasing or reducing the heating of the wire comprising ceasing the heating of the wire in response to the receiving user input indicating that the base is to take on the substantially flat profile.

Example 47 is a display device comprising a flexible display; and a flexible display support comprising one or more slots, individual of the slots housing an adjustable strip comprising a first strip portion at least partially overlapping and physically coupled to a second strip portion by a gearwheel, individual of the slots further comprising a first slot portion to at least partially house the first strip portion and a second slot portion to at least partially house the second strip portion, the gearwheel to increase a length of the adjustable strip by rotating in a first rotational direction to increase a curvature of the display device, the gearwheel to reduce the length of the adjustable strips by rotating in a second rotational direction opposite to the first rotational direction to reduce the curvature of the display device.

Example 48 is the display device of example 47, wherein the display device is a lid or incorporated into a lid of a computing device, the lid rotatably attached to a base of the computing device.

Example 49 is the display device of example 47, wherein the display device further comprises a motor to drive the gearwheel.

Example 50 is the display device of example 47, wherein the gearwheel is manually operable by a user.

Example 51 is the display device of example 47, wherein the base of the computing device further comprises one or more processors; and one or more computer-readable storage media having instructions stored thereon that, when executed, cause the one or more processors to provide control signals to the motor to cause the gearwheel to rotate to change the curvature of the display device.

Example 52 is the display device of example 47, wherein the base of the computing device further comprises one or more processors; and one or more computer-readable storage media having instructions stored thereon that, when executed, cause the one or more processors to receive user input indicating that the flexible display is to curve; and cause the gearwheel to rotate to cause the display device to curve.

Example 53 is the display device of example 47, wherein the base of the computing device further comprises one or more processors; and one or more computer-readable storage media having instructions stored thereon that, when executed, cause the one or more processors to cause the gearwheel to rotate to open a file or application associated with a file-level or system-level setting indicating that the file or application has restricted access; and cause the one or more processors to cause the gearwheel to rotate to curve the display device in response to opening the file.

Example 54 is the display device of example 47, wherein the display device is incorporated into a head-mounted display.

Example 55 is the display device of example 47, the base further comprising a plurality of base portions, the plurality of base portions comprising one or more left base portions, one or more middle base portions, and one or more right base portions; a bending strap attached at a first end of the bending strap to one of the left base portions and attached at a second end of the bending strap to one of the right base portions; a lid comprising a display, the lid rotatably coupled to the base; and a lifter spring attached to the lid and extending into the base; wherein a portion of the lifter spring is to push upwards against a portion of the bending strap to cause the bending strap to bend when the lid is opened, the bending of the bending strap to cause the left base portions and the right base portions to pull inwards toward a y-axis bisector of the base to cause the base to curve.

Example 56 is a method comprising increasing or decreasing the temperature of a wire in a base of a computing device to change a curvature of the base of the computing device; wherein the base comprises a plurality of base portions, the plurality of base portions comprising one or more left base portions, one or more middle base portions, and one or more right base portion; wherein the wire is attached at a first end of the wire to one of the left base portions and attached at a second end of the wire to one of the right base portions, the one of the left base portions comprising one or more left pulleys, the one of the right base portions comprising one or more right pulleys, the wire alternatively wrapped around individual of the left pulleys and individual of the right pulleys; and wherein the wire contracts lengthwise when heated to cause the left base portions and the right base portions to be pulled inwards toward a y-axis bisector of the base to cause the base to curve.

Example 57 is the method of example 56, further comprising causing the computing device to execute a power-on process, wherein increasing or decreasing the temperature of the wire comprises increasing the temperature of the wire as part of the power-on process.

Example 58 is the method of example 56, further comprising causing the computing device to exit a low-power state, wherein increasing or decreasing the temperature of the wire comprises increasing the temperature of the wire as part of the computing device exiting the low-power state.

Example 59 is the method of example 56, further comprising detecting an opening of a lid of the computing device, wherein increasing or decreasing the temperature of the wire comprises increasing the temperature of the wire in response to the detecting the opening of the lid.

Example 60 is the method of example 56, wherein increasing or decreasing the temperature of the wire comprises increasing the temperature of the wire is based on an identity of a user of the computing device.

Example 61 is the method of example 56, further comprising opening an application or a file on the computing device, wherein the increasing or decreasing the temperature of the wire comprises increasing the temperature of the wire in response to the opening of the application or the file on the computing device.

Example 62 is the method of example 56, further comprising detecting that a temperature of the base has exceeded a temperature threshold, wherein increasing or decreasing the temperature of the wire comprises increasing the temperature of the wire in response to the detecting that the temperature of the base has exceed the temperature threshold.

Example 63 is the method of example 56, further comprising detecting that an environmental temperature exceeds a temperature threshold, wherein increasing or decreasing the temperature of a wire comprises decreasing the temperature of the wire in response to the detecting that the environmental temperature exceeds the temperature threshold.

Example 64 is the method of example 56, further comprising receiving user input indicating that the base of the computing is to curve, wherein the increasing or decreasing the temperature of the wire comprises increasing or decreasing the temperature of the wire is based on the received user input.

Example 65 is the method of example 56, further comprising causing the computing device to execute a power-down process, wherein the increasing or decreasing the temperature of a wire comprises decreasing the temperature of the wire as part of the power-down process.

Example 66 is the method of example 56, further comprising causing the computing device to enter a low-power state, wherein the increasing or decreasing the temperature of a wire comprises decreasing the temperature of the wire as part of the computing device entering the low-power state.

Example 67 is the method of example 56, further comprising detecting the lid being closed, wherein the increasing or decreasing the temperature of a wire comprises decreasing the temperature of the wire is performed in response to the detecting the lid being closed.

Example 68 is the method of example 56, further comprising executing a logoff process for a user of the computing device, wherein the increasing or decreasing the temperature of a wire comprises decreasing the temperature of the wire is performed as part of the logoff process.

Example 69 is the method of example 56, further comprising closing an application, wherein the increasing or decreasing the temperature of the wire comprises decreasing the temperature of the wire in response to closing the application.

Example 70 is a method comprising rotating a gearwheel to increase or decrease the length of one or more adjustable strips in a display device to change a curvature of the display device; wherein the display device further comprises a flexible display support comprising one or more slots, individual of the slots housing individual of the adjustable strips, individual of the adjustable strips comprising a first strip portion physically coupled to and at least partially overlapping a second strip portion by the gearwheel, individual of the slots further comprising a first slot portion to house the first strip portion and a second slot portion to house the second strip portion, the gearwheel to extend a length of the individual strips by rotating in a first rotational direction to increase a curve of the flexible display, the gearwheel to contract the length of the individual strips by rotating in a second rotational direction opposite to the first rotational direction to reduce the curve of the flexible display.

Example 71 is the method of example 70, further comprising causing the computing device to execute a power-up process, wherein the rotating the gearwheel to increase or decrease the length of the one or more adjustable strips is performed as part of the power-up process.

Example 72 is the method of example 70, further comprising causing the computing device to exit a low-power state, wherein the rotating the gearwheel to increase or decrease the length of the one or more adjustable strips is performed as part of the computing device exiting the low-power state.

Example 73 is the method of example 70, further comprising detecting an opening of the lid, wherein the rotating the gearwheel to increase or decrease the length of the one or more adjustable strips is performed in response to the detecting the opening of the lid.

Example 74 is the method of example 70, wherein the rotating the gearwheel to increase or decrease the length of the one or more adjustable strips is performed based on an identity of a user of the computing device.

Example 75 is the method of example 70, further comprising opening an application or a file on the computing device, wherein the rotating the gearwheel to increase or decrease the length of the one or more adjustable strips is performed in response to the opening of the application or the file.

Example 76 is the method of example 75, wherein the application or the file is associated with a file-level or system-level setting indicating that the file or application has restricted access.

Example 77 is the method of example 70, further comprising receiving user input that the base of the computing device is to curve, wherein the rotating the gearwheel to increase or decrease the length of the one or more adjustable strips is performed based on the received user input.

Example 78 is the method of example 70, further comprising causing the computing device to execute a power-down process, wherein the rotating the gearwheel to increase or decrease the length of the one or more adjustable strips is performed as part of the power-down process.

Example 79 is the method of example 70, further comprising causing the computing device to enter a low-power state, wherein the rotating the gearwheel to increase or decrease the length of the one or more adjustable strips is performed as part of the computing device entering the low-power state.

Example 80 is the method of example 70, further comprising detecting the lid being closed, wherein the rotating the gearwheel to increase or decrease the length of the one or more adjustable strips is performed in response to detecting the lid being closed.

Example 81 is the method of example 70, further comprising executing a logoff process for a user of the computing device, wherein the rotating the gearwheel to increase or decrease the length of the one or more adjustable strips is performed as part of the logoff process.

Example 82 is the method of example 70, further comprising closing an application or a file, wherein the rotating the gearwheel to increase or decrease the length of the one or more adjustable strips is performed in response to closing the application or file.

Example 83 is one or more non-transitory computer-readable storage media having stored thereon instructions that when executed cause one or more processors to perform the method of any of the examples 56-82.

Example 84 is an apparatus comprising a means to perform any one of the method of examples 56-82.

Example 85 is a computing device comprising a base; a lid rotatably attached to the base; and a curvature means to cause the base to curve as the lid is opened.

Example 86 is the computing device of example 85, wherein the more the lid is opened the more the base is curved.

Example 87 is the computing device of example 85, wherein the base is substantially flat when the lid is closed.

Example 88 is a computing device comprising a base; a lid rotatably attached to the base, the comprising a display; and a curvature means to cause the base to curve in response to first user input received at the computing device.

Example 89 is the computing device of example 88, wherein the display is a flexible display, the computing device further comprising a display curvature means to cause the flexible display to curve in response to second user input received at the computing device.

We claim:

1. A computing device, comprising:
   a base comprising a plurality of base portions, the plurality of base portions comprising one or more left base portions, one or more middle base portions, and one or more right base portions;
   a bending strap attached at a first end of the bending strap to one of the left base portions and attached at a second end of the bending strap to one of the right base portions;
   a lid comprising a display, the lid rotatably coupled to the base; and
   a lifter spring attached to the lid and extending into the base;
   wherein a portion of the lifter spring is to push upwards against a portion of the bending strap to cause the bending strap to bend when the lid is opened, the bending of the bending strap to cause the left base portions and the right base portions to pull inwards toward a y-axis bisector of the base to cause the base to curve.

2. The computing device of claim 1, wherein at least one of the base portions is rigid, the bending of the bending strap to cause the left base portions and the right base portions to pull inwards toward the y-axis bisector of the base comprising individual of the at least one rigid base portions to flex relative to a base portion adjacent to the individual rigid base portion.

3. The computing device of claim 1, wherein at least one of the middle base portions is flexible, the bending of the bending strap to cause the left base portions and the right base portions to pull inwards toward the y-axis bisector of the base comprising individual of the flexible middle base portions to curve.

4. The computing device of claim 1, wherein the base further comprises a cavity and the portion of the lifter spring buckles into the cavity to push upwards against the portion of the bending strap as the lid is opened.

5. The computing device of claim 1, further comprising a hinge to rotatably couple the lid to the base, wherein the lifter spring wraps around the hinge.

6. The computing device of claim 1, wherein the lifter spring comprises nitinol.

7. The computing device of claim 1, wherein the more the lid opens the more the base curves.

8. The computing device of claim 1, wherein the base further comprises a flexible display that extends at least partially over the base portions, the flexible display being substantially flat when the lid is closed and at least a portion of the flexible display being curved when the lid is open.

9. The computing device of claim 1, wherein the base comprises a keyboard that extends over one or more of the base portions, the keyboard being substantially flat when the lid is closed and at least a portion of the keyboard being curved when the lid is open.

10. An apparatus comprising:
    a flexible display; and
    a flexible display support comprising two or more slots, individual of the slots housing an adjustable strip comprising a first strip portion at least partially overlapping and physically coupled to a second strip portion by a gearwheel, individual of the two or more slots further comprising a first slot portion to at least partially house the first strip portion and a second slot portion to at least partially house the second strip portion, the gearwheel to increase a length of the adjustable strip by rotating in a first rotational direction to increase a curvature of the flexible display, the gearwheel to reduce the length of the adjustable strips by rotating in a second rotational direction opposite to the first rotational direction to reduce the curvature of the flexible display.

11. The apparatus of claim 10, wherein the apparatus further comprises a computing device comprising a lid and a base, the lid rotatably attached to the base of the computing device.

12. The apparatus of claim 10, further comprising a motor to drive the gearwheel, the apparatus further comprising:
    one or more processors; and
    one or more non-transitory computer-readable storage media having instructions stored thereon that, when executed, cause the one or more processors to provide control signals to the motor to cause the gearwheel to rotate to change the curvature of the flexible display.

13. The apparatus of claim 10, wherein the apparatus further comprises:
    one or more processors; and
    one or more non-transitory computer-readable storage media having instructions stored thereon that, when executed, cause the one or more processors to:
    receive user input indicating that the flexible display is to curve; and
    cause the gearwheel to rotate to cause the flexible display device to curve.

14. The apparatus of claim 10, further comprising a base, the base comprising:
    a plurality of base portions, the plurality of base portions comprising one or more left base portions, one or more middle base portions, and one or more right base portions;
    a bending strap attached at a first end of the bending strap to one of the left base portions and attached at a second end of the bending strap to one of the right base portions;
    a lid comprising a display, the lid rotatably coupled to the base; and
    a lifter spring attached to the lid and extending into the base;
    wherein a portion of the lifter spring is to push upwards against a portion of the bending strap to cause the bending strap to bend when the lid is opened, the bending of the bending strap to cause the left base portions and the right base portions to pull inwards toward a y-axis bisector of the base to cause the base to curve.

15. The apparatus of claim 10, wherein the curvature of the flexible display increases by ends of the flexible display being pushed inwards towards a bisector of the flexible display, individual of the slots extending in a direction orthogonal from the bisector.

16. The apparatus of claim 10, wherein the curvature of the flexible display increases by, for individual of the slots, ends of the adjustable strip housed by the individual slot pushing against interior ends of the individual slot.

17. The apparatus of claim 10, wherein individual of the slots comprise a first slot portion and a second slot portion, the first slot portion to house the first strip portion of the adjustable strip housed by the individual slot and a second slot portion to house the second strip portion of the adjustable strip housed by the individual slot.

18. A method comprising rotating a gearwheel to increase or decrease the length of two or more adjustable strips in a display device to change a curvature of the display device; wherein the display device further comprises a flexible display support comprising two or more slots, individual of the two or more slots housing individual of the adjustable strips, individual of the adjustable strips comprising a first strip portion physically coupled to and at least partially overlapping a second strip portion by the gearwheel, individual of the two or more slots further comprising a first slot portion to house the first strip portion and a second slot portion to house the second strip portion, the gearwheel to extend a length of the individual strips by rotating in a first rotational direction to increase a curve of the flexible display, the gearwheel to contract the length of the individual strips by rotating in a second rotational direction opposite to the first rotational direction to reduce the curve of the flexible display.

19. The method of claim 18, further comprising causing a computing device comprising the display device to execute a power-up process, wherein the rotating the gearwheel to increase or decrease the length of the one or more adjustable strips is performed as part of the power-up process.

20. The method of claim 18, further comprising detecting an opening of a lid of a computing device comprising the display device, wherein the rotating the gearwheel to increase or decrease the length of the one or more adjustable strips is performed in response to the detecting the opening of the lid.

21. The method of claim 18, wherein the rotating the gearwheel to increase or decrease the length of the one or more adjustable strips is performed based on an identity of a user of a computing device comprising the display device.

22. The method of claim 18, further comprising receiving user input that a base of a computing device comprising the display device is to curve, wherein the rotating the gearwheel to increase or decrease the length of the one or more adjustable strips is performed based on the received user input.

23. The method of claim 18, further comprising detecting a lid of a computing device comprising the display device being closed, wherein the rotating the gearwheel to increase or decrease the length of the one or more adjustable strips is performed in response to detecting the lid being closed.

24. A computing device comprising:
   a base;
   a lid rotatably attached to the base; and
   a curvature means to cause the base to curve as the lid is opened.

25. The computing device of claim 24, wherein the more the lid is opened the more the base is curved.

* * * * *